US010038915B2

(12) United States Patent
Joshi et al.

(10) Patent No.: US 10,038,915 B2
(45) Date of Patent: Jul. 31, 2018

(54) ESCAPE SAMPLE CODING IN PALETTE-BASED VIDEO CODING

(71) Applicant: QUALCOMM Incorporated, San Diego, CA (US)

(72) Inventors: Rajan Laxman Joshi, San Diego, CA (US); Vadim Seregin, San Diego, CA (US); Wei Pu, San Diego, CA (US); Marta Karczewicz, San Diego, CA (US); Joel Sole Rojals, San Diego, CA (US); Krishnakanth Rapaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 14/719,215

(22) Filed: May 21, 2015

(65) Prior Publication Data

US 2015/0341660 A1     Nov. 26, 2015

Related U.S. Application Data

(60) Provisional application No. 62/002,054, filed on May 22, 2014, provisional application No. 62/010,313, (Continued)

(51) Int. Cl.
*H04N 7/12*     (2006.01)
*H04N 19/583*     (2014.01)
(Continued)

(52) U.S. Cl.
CPC ......... *H04N 19/583* (2014.11); *H04N 19/132* (2014.11); *H04N 19/176* (2014.11);
(Continued)

(58) Field of Classification Search
CPC .... H04N 19/176; H04N 19/70; H04N 19/463; H04N 19/186; H04N 19/93; H04N 19/132; H04N 19/44; H04N 19/583
See application file for complete search history.

(56) References Cited

U.S. PATENT DOCUMENTS 4,568,983 A    2/1986   Bobick
5,883,678 A    3/1999   Yamaguchi et al.
(Continued)

FOREIGN PATENT DOCUMENTS

WO    WO 2015/103390 A1 *   7/2015       H04N 19/176

OTHER PUBLICATIONS

Response to Second Written Opinion dated Jun. 1, 2016, from International Application No. PCT/US2015/032250, filed on Aug. 1, 2016, 4 pp.
Response to Second Written Opinion dated Jun. 3, 2016, from International Application No. PCT/US2015/032256, filed on Aug. 3, 2016, 15 pp.
Response to Second Written Opinion dated Apr. 29, 2016, from International Application No. PCT/US2015/032247, filed on Jun. 28, 2016, 5 pp.
(Continued)

*Primary Examiner* — Sathyanaraya V Perungavoor
*Assistant Examiner* — Peet Dhillon
(74) *Attorney, Agent, or Firm* — Shumaker & Sieffert, P.A.

(57) ABSTRACT

In an example, a method of processing video data includes determining a value of a block-level syntax element that indicates, for all samples of a block of video data, whether at least one respective sample of the block is coded based on a color value of the at least one respective sample not being included in a palette of colors for coding the block of video data. The method also includes coding the block of video data based on the value.

30 Claims, 11 Drawing Sheets

Related U.S. Application Data filed on Jun. 10, 2014, provisional application No. 62/015,240, filed on Jun. 20, 2014, provisional application No. 62/031,766, filed on Jul. 31, 2014, provisional application No. 62/040,978, filed on Aug. 22, 2014, provisional application No. 62/114,533, filed on Feb. 10, 2015, provisional application No. 62/115,099, filed on Feb. 11, 2015.

(51) Int. Cl.

| | |
|---|---|
| *H04N 19/44* | (2014.01) |
| *H04N 19/132* | (2014.01) |
| *H04N 19/176* | (2014.01) |
| *H04N 19/70* | (2014.01) |
| *H04N 19/463* | (2014.01) |
| *H04N 19/186* | (2014.01) |
| *H04N 19/93* | (2014.01) |

(52) U.S. Cl.
CPC ........... *H04N 19/186* (2014.11); *H04N 19/44* (2014.11); *H04N 19/463* (2014.11); *H04N 19/70* (2014.11); *H04N 19/93* (2014.11)

(56) References Cited

U.S. PATENT DOCUMENTS

| | | | |
|---|---|---|---|
| 2014/0301474 | A1 | 10/2014 | Guo et al. |
| 2014/0301475 | A1 | 10/2014 | Guo et al. |
| 2015/0016501 | A1 | 1/2015 | Guo et al. |
| 2015/0264365 | A1* | 9/2015 | Tsai ................... H04N 19/593 375/240.03 |
| 2015/0271505 | A1 | 9/2015 | Ma et al. |
| 2015/0281728 | A1 | 10/2015 | Karczewicz et al. |
| 2015/0341635 | A1 | 11/2015 | Seregin et al. |
| 2015/0341655 | A1 | 11/2015 | Joshi et al. |
| 2015/0341656 | A1 | 11/2015 | Seregin et al. |
| 2015/0341660 | A1 | 11/2015 | Joshi et al. |
| 2015/0341673 | A1 | 11/2015 | Joshi et al. |
| 2015/0341674 | A1 | 11/2015 | Seregin et al. |
| 2016/0316214 | A1 | 10/2016 | Gisquet et al. |

OTHER PUBLICATIONS

Third Written Opinion from International Application PCT/US2015/032247, dated Jul. 20, 2016, 12 pp.
Response to Third Written Opinion dated Jul. 20, 2016, from International Application PCT/US2015/032247, filed on Aug. 19, 2016, 4 pp.
International Preliminary Report on Patentability from International Application No. PCT/US2015/032247, dated Sep. 7, 2016, 15 pp.
International Preliminary Report on Patentability from International Application No. PCT/US2015/032250, dated Sep. 7, 2016, 10 pp.
International Preliminary Report on Patentability from International Application No. PCT/US2015/032256, dated Sep. 23, 2016, 7 pp.
Preliminary Amendment from U.S. Appl. No. 14/719,222, dated Nov. 4, 2016, 8 pp.
Marpe D., et al., "Context-based adaptive binary arithmetic coding in the H.264/AVC video compression standard", IEEE Transactions on Circuits and Systems for Video Technology, IEEE Service Center, pp. 620-636, XP011099255, vol. 13 (7), Jul. 2003.
Non-Final Office Action from U.S. Appl. No. 14/719,228 dated Jan. 23, 2017 (25 pages).
Non-Final Office Action from U.S. Appl. No. 14/719,222 dated Jan. 20, 2017 (23 pages).
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
"Exp-Golomb code, HEVC version 1 specification, Section 9.3.3.3," ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bugdayci et al., "AHG10: Improvements on Palette Coding," JCT-VC Meeting; Mar. 27-Apr. 4, 2014; Valencia; (Joint Collaborative Team on Video Coding of ISO/IEC JTC1/SC29/WG11 and ITU-T SG.16); No. JCTVC-Q0071-V2, XP030115970, Mar. 18, 2014, 8 pp.
Chen et al., "Description of Screen Content Coding Technology Proposal by Qualcomm," JCT-VC Meeting, Valencia, Mar. 27-Apr. 4, 2014, (Joint Collaborative Team on Video Coding of ISO/IEC JTC1/SC29/WG11 and ITU-T SG.16), No. JCTVC-Q0031-v3, XP030115916, Mar. 28, 2014, 19 pp.
Guo et al., "Evaluation of Palette Mode Coding on HM-12.0+RExt-4.1," JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0218-v3, XP030115268, Oct. 18, 2013, 7 pp.
Guo et al., "RCE4: Results of Test 2 on Palette Mode for Screen Content Coding," JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P0198, XP030115730, Jan. 2, 2014, 3 pp.
Guo et al., "RCE4: Results of Test 2 on Palette Mode for Screen Content Coding," Joint Collaborative Team on Video Coding (JCT-

(56) References Cited

OTHER PUBLICATIONS

VC) of ITU-T SG 16 WP 3 and ISO/IEC JTC 1/SC 29/WG 11, 16th Meeting: San José, US, Jan. 9-17, 2014, JCTVC-P0198, Jan. 8, 2014, 3 pp.

Huang et al., "Description of Screen Content Core Experiment 3 (SCCE3): Palette Mode," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q1123, Apr. 18, 2014, 11 pp.

International Search Report and Written Opinion—PCT/US2015/032247—ISA/EPO—dated Oct. 22, 2015, 14 pp.

International Search Report and Written Opinion—PCT/US2015/032250—ISA/EPO—dated Sep. 14, 2015, 13 pp.

International Search Report and Written Opinion—PCT/US2015/032256—ISA/EPO—dated Aug. 31, 2015, 12 pp.

Joshi et al., "CE6 subtest A.6: Binarization for run coding in palette mode," JCT-VC Meeting; Oct. 17-24, 2014; Strasbourg; (Joint Collaborative Team on Video Coding of ISO/IEC JTC1/SC29/WG11 and ITU-TSG.16 ); URL: http://wftp3.1tu.int/av-arch/jctvc-site/, No. JCTVC-S0039-v4, XP030116766, Oct. 15, 2014, 9 pp.

Laroche et al., "AhG10: Run coding for palette mode," JCT-VC Meeting; Mar. 27-Apr. 4, 2014; Valencia; (Joint Collaborative Team on Video Coding of ISO/ IEC JTC1/SC29/WG11 and ITU-T SG.16 ); URL: http://wftp3.1tu.int/av -arch/jctvc-site/, No. JCTVC-Q0066, XP030115961, Mar. 17, 2014, 2 pp.

Laroche et al., "Non-RCE4: Run Coding for Palette Mode," JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0113-v5, XP030115609, Jan. 9, 2014, 8 pp.

Pu et al., "SCCE3: Test C.4—Combination of Tests A.3, A.7, A.8, B.12, and B.13," JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0067, XP030116311, Jun. 21, 2014, 3 pp.

Pu et al., "AHG18: Simplification of Palette Based Coding," JCT-VC Meeting; Mar. 27-Apr. 4, 2014; Valencia; (Joint Collaborative Team on Video Coding of ISO/IEC JCT1/SC29/WG11 and ITU-T SG.16); URL: http://wftp3.itu.int/av-arch/jctvc-site/,, No. JCTVC-Q0047, XP030115936, Mar. 17, 2014, 4 pp.

Pu et al., "Non-RCE4: Refinement of the palette in RCE4 Test 2," JCT-VC Meeting; Jan. 9-17, 2014; San Jose; (Joint Collaborative Team on Video Coding of ISO/IEC JCT1/SC29/WG11 and ITU-T SG.16); URL: http://wftp3.itu.int/av-arch/jctvc-site/,, No. JCTVC-P0231, XP030115773, Jan. 7, 2014, 4 pp.

Pu et al., "AHG10: Suggested Software for Palette Coding based on RExt6.0," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0094, XP030116005, Mar. 18, 2014, 4 pp.

Sullivan et al., "Meeting Report of the 16th JCT-VC Meeting (San Jose, US, Jan. 9-17, 2014)," JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P1000, XP030115872, Mar. 26, 2014, 158 pp.

Sun et al., "AHG10: A Triplet Palette Mode Combining JCTVC-P0108 and JCTVC-P0198," JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q0083-v3, XP030115988, Mar. 27, 2014, 9 pp.

Xiu et al., "Description of Screen Content Coding Technology Proposal by Inter Digital," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0037, XP030115927, Mar. 18, 2014, 30 pp.

"Truncated binary encoding," Wikipedia, the free encyclopedia, retrieved from https://en.wikipedia.org/w/index.php?title=Truncated_binary_encoding&oldid=713477451, Apr. 4, 2016, 4 pp.

Gisquet et al., "AhG10: palette index coding," Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014, JCTVC-Q0064, Mar. 29, 2014, 3 pp.

Pu et al., "AHG10: Suggested Software for Palette Coding based on RExt6.0," Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, JCTVC-Q0094, May 22, 2014, 4 pp.

Joshi et al., "Non-SCCE3: Contexts for coding index runs," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0174_r2, Jul. 1, 2014, 3 pp.

"Text specification for JCTVC-R0174," JCTVC-R0174-WD-r1, Jun. 30, 2014, 1 pp.

Seregin et al., "Non-SCCE3: Run-length coding for palette predictor," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0228, Jun. 21, 2014, 3 pp.

Seregin et al., "Non-SCCE3: Run-length coding for palette predictor," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0228r1, Jul. 1, 2014, 4 pp.

Joshi et al., "High Efficiency Video Coding (HEVC) Screen Content Coding: Draft 2," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-S1005, Dec. 10, 2014, 374 pp.

Joshi et al., "High Efficiency Video Coding (HEVC) Screen Content Coding: Draft 3," Joint Collaborative Team on Video Coding (JCT-VC) of ITU-T SG 16 WP 3 and ISO/IEC JTC 1/SC 29/WG 11, 20th Meeting: Geneva, CH, 10 Feb. 10-17, 2015, JCTVC-T1005, Apr. 5, 2015, 565 pp.

Response to Written Opinion dated Oct. 22, 2015, from International Application No. PCT/US2015/032247, dated Mar. 21, 2016, 20 pp.

Response to Written Opinion dated Sep. 14, 2015, from International Application No. PCT/US2015/032250, dated Mar. 22, 2016, 16 pp.

Response to Written Opinion dated Aug. 31, 2015, from International Application No. PCT/US2015/032256, dated Mar. 22, 2016, 15 pp.

"1 Draft Texts, 7.3.8.5 Coding unit syntax," JCTVC-P0198, Jan. 8, 2014, 10 pp.

Second Written Opinion of International Application No. PCT/US2015/032247, dated Apr. 29, 2016, 10 pp.

Chang et al., "Non-SCCE3: Adaptive escape scheme for palette mode," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0051, Jun. 15, 2014, 3 pp.

Pu et al., "SCCE3: Test B.13—Flag to Indicate Escape and Index Coding," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0066, Jun. 21, 2014, 3 pp.

U.S. Appl. No. 61/993,980, by Fnu Hendry, filed May 15, 2014.

U.S. Appl. No. 62/031,766, by Wei Pu, filed Jul. 31, 2014.

U.S. Appl. No. 62/040,978, by Wei Pu, filed Aug. 22, 2014.

Second Written Opinion of International Application No. PCT/US2015/032250, dated Jun. 1, 2016, 8 pp.

Second Written Opinion of International Application No. PCT/US2015/032256, dated Jun. 3, 2016, 7 pp.

* cited by examiner

ESCAPE SAMPLE CODING IN PALETTE-BASED VIDEO CODING

This application claims the benefit of U.S. Provisional Application No. 62/002,054, filed May 22, 2014, U.S. Provisional Application No. 62/010,313, filed Jun. 10, 2014, U.S. Provisional Application No. 62/015,240, filed Jun. 20, 2014, U.S. Provisional Application No. 62/031,766 filed Jul. 31, 2014, U.S. Provisional Application No. 62/040,978, filed Aug. 22, 2014, U.S. Provisional Application No. 62/114,533, filed Feb. 10, 2015, and U.S. Provisional Application No. 62/115,099, filed Feb. 11, 2015, the entire contents of each of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2. MPEG-4, ITU-T H.263, ITU-T H.264/MPEG-4. Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to palette-based video coding. For example, in palette-based coding, a video coder (a video encoder or video decoder) may form a "palette" as a table of colors for representing the video data of the particular area (e.g., a given block). Palette-based coding may be especially useful for coding areas of video data having a relatively small number of colors. Rather than coding actual pixel values (or their residuals), the video coder may code palette indices for one or more of the pixels that relate the pixels with entries in the palette representing the colors of the pixels. The techniques described in this disclosure may include techniques for various combinations of one or more of signaling palette-based coding modes, transmitting palettes, deriving palettes, and transmitting palette-based coding maps and other syntax elements.

In an example, a method of processing video data includes determining a value of a block-level syntax element that indicates, for all samples of a block of video data, whether at least one respective sample of the block is coded based on a color value of the at least one respective sample not being included in a palette of colors for coding the block of video data, and coding the block of video data based on the value.

In another example, a device for processing video data includes a memory configured to store a block of samples of video data, and one or more processors configured to determine a value of a block-level syntax element that indicates, for all the samples of the block of video data, whether at least one respective sample of the block is coded based on a color value of the at least one respective sample not being included in a palette of colors for coding the block of video data, and code the block of video data based on the value.

In another example, an apparatus for processing video data includes means for determining a value of a block-level syntax element that indicates, for all samples of a block of video data, whether at least one respective sample of the block is coded based on a color value of the at least one respective sample not being included in a palette of colors for coding the block of video data, and means for coding the block of video data based on the value.

In another example, a non-transitory computer-readable medium has stored thereon instructions that, when executed, cause one or more processors to determine a value of a block-level syntax element that indicates, for all samples of a block of video data, whether at least one respective sample of the block is coded based on a color value of the at least one respective sample not being included in a palette of colors for coding the block of video data, and code the block of video data based on the value.

In another example, a method of processing video data includes coding at least one of data that indicates a maximum palette size of a palette of color values for coding a block of video data or data that indicates a maximum palette predictor size of a palette predictor for determining the palette of color values, and coding the block of video data in accordance with the data.

In another example, a device for processing video data includes a memory configured to store a block of video data, and one or more processors configured to code at least one of data that indicates a maximum palette size of a palette of color values for coding the block of video data or data that indicates a maximum palette predictor size of a palette predictor for determining the palette of color values, and code the block of video data in accordance with the data coded from the bitstream.

In another example, an apparatus for processing video data includes means for coding at least one of data that indicates a maximum palette size of a palette of color values for coding a block of video data or data that indicates a maximum palette predictor size of a palette predictor for determining the palette of color values, and means for coding the block of video data in accordance with the data.

In another example, a non-transitory computer-readable medium has instructions stored thereon that, when executed, cause one or more processors to code at least one of data that indicates a maximum palette size of a palette of color values for coding a block of video data or data that indicates a maximum palette predictor size of a palette predictor for determining the palette of color values, and code the block of video data in accordance with the data.

In another example, a method of coding video data includes determining, for a pixel associated with a palette index that relates a value of the pixel to a color value in a palette of colors used for coding the pixel, a run length of a run of palette indices being coded with the palette index of the pixel, determining a maximum run length for a maximum run of palette indices able to be coded with the palette index of the pixel, and coding data that indicates the run length based on the determined maximum run length.

In another example, a device for coding video data includes a memory configured to store a pixel of video data associated with a palette index that relates a value of the pixel to a color value in a palette of colors used for coding the pixel, and one or more processors configured to determine, for the pixel, a run length of a run of palette indices being coded with the palette index of the pixel, determining a maximum run length for a maximum run of palette indices able to be coded with the palette index of the pixel, and code data that indicates the run length based on the determined maximum run length.

In another example, an apparatus for processing video data includes means for determining, for a pixel associated with a palette index that relates a value of the pixel to a color value in a palette of colors used for coding the pixel, a run length of a run of palette indices being coded with the palette index of the pixel, means for determining a maximum run length for a maximum run of palette indices able to be coded with the palette index of the pixel, and means for coding data that indicates the run length based on the determined maximum run length.

In another example, a non-transitory computer-readable medium has instructions stored thereon that, when executed, cause one or more processors to determine, for a pixel associated with a palette index that relates a value of the pixel to a color value in a palette of colors used for coding the pixel, a run length of a run of palette indices being coded with the palette index of the pixel, determine a maximum run length for a maximum run of palette indices able to be coded with the palette index of the pixel, and code data that indicates the run length based on the determined maximum run length.

The details of one or more examples of the disclosure are set forth in the accompanying drawings and the description below. Other features, objects, and advantages will be apparent from the description, drawings, and claims.

DETAILED DESCRIPTION

Figure 1:
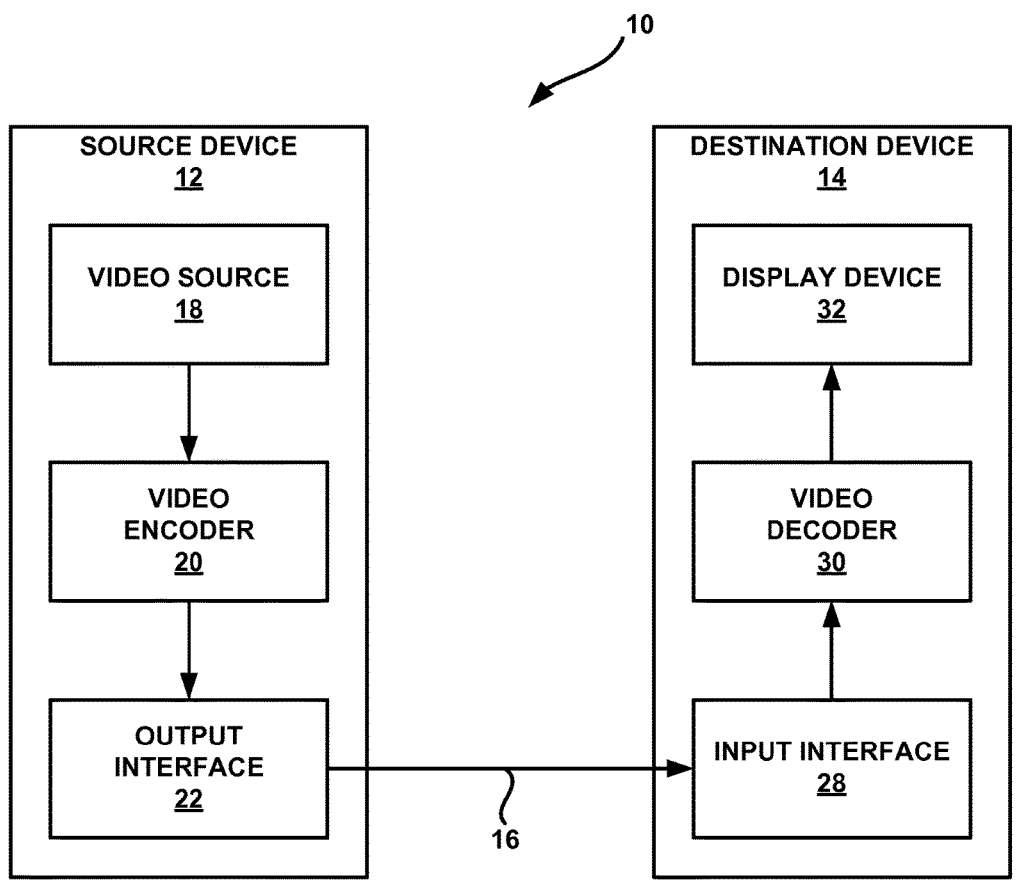
FIG. 1 is a block diagram illustrating an example video coding system that may utilize the techniques described in this disclosure.

Aspects of this disclosure are directed to techniques for video coding and compression. In particular, this disclosure describes techniques for palette-based coding of video data. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines, and high contrast object boundaries. The assumption of continuous-tone and smoothness may no longer apply, and thus, traditional video coding techniques may be inefficient ways to compress the content.

This disclosure describes palette-based coding, which may be particularly suitable for screen generated content coding (e.g., screen content coding (SCC)). The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, 12$^{th}$ Meeting of JCT-VC of ITU-T SG16 WP 3 and ISO/IEC JCT 1/SC 29/WG 11, 14-23 Jan. 2013 ("HEVC Draft 10").

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In palette-based coding, a particular area of video data may be assumed to have a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with palette indices (also referred to as palette index values) for the pixels relating the pixel value to the palette. A video decoder may obtain, from an encoded bitstream, a palette for a block, as well as palette indices for the pixels of the block. The video decoder may relate the palette indices of the pixels to entries of the palette to reconstruct the pixel values of the block. Pixels (and/or related palette indices that indicate a pixel value) may generally be referred to as samples.

It is assumed that samples in the block are processed (e.g., scanned) using horizontal raster scanning order. For example, the video encoder may convert a two-dimensional block of palette indices into a one-dimensional array by scanning the palette indices using a horizontal raster scanning order. Likewise, the video decoder may reconstruct a block of palette indices using the horizontal raster scanning order. Accordingly, this disclosure may refer to a previous sample as a sample that precedes the sample currently being coded in the block in the scanning order. It should be appreciated that scans other than a horizontal raster san, such as vertical raster scanning order, may also be applicable. The example above is intended provide a general description of palette-based coding.

A palette typically includes entries numbered by an index and representing color component (for example, RGB, YUV, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks. That is, a palette may contain predicted palette entries predicted from the palette(s) used to code the previous block(s). For example, as described in standard submission document Wei Pu et al., "AHG10: Suggested Software for Palette Coding based on RExt6.0," JCTVC-Q0094, Valencia, ES, 27 Mar.-4 Apr. 2014 (hereinafter JCTVC-Q0094), a palette may include entries that are copied from a predictor palette. A predictor palette may include palette entries from blocks previously coded using palette mode or other reconstructed samples. For each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size in for block.

As proposed JCTVC-Q0094, each sample in a block coded with a palette-based coding mode may be coded using one of the three palette modes, as set forth below:

Escape mode: in this mode, the sample value is not included into a palette as a palette entry and the quantized sample value is signaled explicitly for all color components. It is similar to the signaling of the new palette entries, although for new palette entries, the color component values are not quantized.

CopyFromTop mode (also referred to as CopyAbove mode): in this mode, the palette entry index for the current sample is copied from the sample located directly above in a block.

Value mode (also referred to as Index mode): in this mode, the value of the palette entry index is explicitly signaled.

As described herein, a palette entry index may be referred as a palette index or simply index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., an Red component of RGB data, a Y component of YUV data, or the like). In another example, a palette index may have multiple associated color or intensity values. In some instances, palette-based coding may be applied to code monochrome video. Accordingly, "color value" may generally refer to any color or non-color component used to generate a pixel value.

For CopyFromTop and Value modes, a run value (which may also be referred to simply as run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Value mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy-FromTop mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from an above-neighboring sample and that are being coded with the palette index. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive palette indices of a block may be 0, 2, 2, 2, 2, 5 (e.g., where each index corresponds to a sample in the block). In this example, a video coder may code the second sample (e.g., the first palette index of two) using Value mode. After coding an index that is equal to 2, the video coder may code a run of three, which indicates that the three subsequent samples also have the same palette index of two. In a similar manner, coding a run of four palette indices after coding an index using CopyFromTop mode may indicate that a total of five palette indices are copied from the corresponding palette indices in the row above the sample position currently being coded.

The techniques described in this disclosure may include techniques for various combinations of one or more of signaling palette-based coding modes, transmitting palettes, deriving palettes, and transmitting palette-based coding maps and other syntax elements. In some examples, the techniques of this disclosure may be used to resolve potential redundancies associated with the signaling of the palette modes, palette indices, runs and palette sizes that are present in JCTVC-Q0094 (as well as the reference software implementing the palette mode that was uploaded with the contribution JCTVC-Q0094). Accordingly, as described in greater detail below, the techniques of this disclosure may, in some instances, improve efficiency and improve bitrate when coding video data using a palette mode.

Certain aspects of this disclosure are directed to signaling palette-based coding modes and, in particular, techniques associated with signaling escape samples. For example, escape samples (also referred to as escape pixels) may be samples (or pixels) of a block that do not have a corresponding color represented in a palette for coding the block. Accordingly, escape samples may not be reconstructed using a color entry (or pixel value) from a palette. Instead, the color values for escape samples are signaled in a bitstream separately from the color values of the palette.

As described in greater detail below, a video coder (e.g., a video encoder and a video decoder may code per-sample data that indicates whether a sample of a palette-coded block is coded based on a color of the sample not being included in a palette for the block. e.g., using the process referred to as "Escape mode" above. In one example, the video coder may code a flag for each sample that indicates whether the sample is coded as an escape sample, e.g., using Escape mode (referred to herein as implicit escape signaling). In another example, the video coder may code other syntax (such as an additional palette index, as described below) for a sample that indicates that the sample is coded as an escape sample, e.g., using Escape mode (referred to herein as explicit escape signaling).

According to aspects of this disclosure, for a palette-coded block, one or more syntax elements may indicate, at block-level (e.g., a CU level or LCU level), whether any sample of the block is coded based on a color value of the sample not being included in the palette, e.g., coded as an escape sample. The one or more syntax elements may be referred to as block-level escape syntax. For example, block-level syntax may refer to syntax that is coded or determined while coding a block of video data, such as a CU or LCU. Block-level syntax may be included in a header or with other data that is associated with the block (e.g., data that is coded prior to or subsequent to a block that describes a characteristic of the block). In contrast, other syntax that is not block-level syntax may be included in a slice header or with individual pixels of video data.

In one example, a video coder may be configured to code and/or determine a flag (which may be referred to as a block-level escape flag) that indicates whether any sample of the block is coded based on a color value not being included in the palette. For example, a flag value of zero may indicate that none of the samples of the block are coded using Escape mode. That is, the value of all samples of a block may be determined based on a color value that is included in a palette for coding the block. A flag value of one may indicate that at least one sample of the block is coded using Escape mode. That is, the value of at least one sample is not included in a palette for coding the block and may be separately signaled. Hence, the flag may indicate, for all samples of a block of video data, whether at least one sample of the block has a color value that is not included in a palette for coding the block.

As described in greater detail below, the block-level escape syntax may result, in some instances, in a bit savings. For example, by determining whether any samples of an entire block are coded as an escape sample, the video coder may be able to skip the coding of certain syntax elements associated with escape samples. That is, in instances in which the syntax indicates no samples are coded as escape samples, the video coder may not code any other syntax associated with escape samples for the block (e.g., such as the per-sample syntax noted above). As described in greater detail below, the video coder may also skip the coding of certain syntax when the syntax indicates that at least one sample of a block is coded as an escape sample based on a size of a palette for the block being coded. Accordingly, the techniques of this disclosure may improve bitrate and coding efficiency when coding video data using palette-based coding.

Other aspects of this disclosure are directed to coding maximum palette parameters for palette-mode. For example, a maximum palette size for a palette may typically be a static value that is defined at both a video encoder and a video decoder. Likewise, a maximum size of a palette predictor (used for predicting palettes, as described in greater detail below) may also be a static value that is defined at both a video encoder and a video decoder. Hence, these maximum palette parameters may not be changed, regardless of the particular characteristics of the video data being coded.

According to aspects of this disclosure, a video coder may be configured to code data indicating a maximum palette size and/or a maximum palette predictor size. For example, according to aspects of this disclosure, data that indicates a maximum palette size and/or a maximum palette predictor size may be included in a parameter set, such as a sequence parameter set (SPS). Accordingly, the video coder may code at least one of data that indicates a maximum palette size of a palette of color values for coding a block of video data or data that indicates a maximum palette predictor size of a palette predictor for determining the palette of color values.

Coding data that indicates a maximum palette size and/or a maximum palette predictor size may provide flexibility, which may improve coding efficiency. For example, the techniques may allow a video coder to use palettes and palette predictors of different sizes based on the characteristics of the video data being coded (e.g., based on a bit-depth of the data, a block size, a profile or level associated with the data, or the like). Accordingly, the maximum palette parameters may be tailored to the video data being coded, such that relatively larger maximum palette parameters may be defined for blocks that may benefit from such parameters. In addition, relatively smaller maximum palette parameters may be defined to reduce complexity associated with constructing palettes for blocks less likely to benefit from the relatively larger parameters.

Other aspects of this disclosure are directed to techniques coding various syntax elements for palette-based video coding. For example, the techniques of this disclosure include coding syntax for palette coding, such as a run value (also referred to as a run-length value) of palette indices, a palette prediction vector, or other palette related syntax, using a code that considers a maximum potential value of the syntax being coded. In some instances, according to aspects of this disclosure, the syntax may be coded using a form of Exponential Golomb code, as described in greater detail below. The techniques may, in some instances, reduce the number of bits needed to represent palette related syntax.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette-based coding. Non-palette-based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. So, is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette-based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with palette indices for the pixels relating the pixel value to the palette. Video decoder 30 may obtain, from an encoded bitstream, a palette for a block, as well as palette indices for the pixels of the block. Video decoder 30 may relate the palette indices of the pixels to entries of the palette to reconstruct the pixel values of the block.

As noted above, video encoder 20 and video decoder 30 may use a number of different palette coding modes to code palette indices of a palette. For example, video encoder 20 and video decoder 30 may use an Escape mode, a CopyFromTop mode (also referred to as CopyAbove mode), or a Value mode (also referred to as Index mode) to code palette indices of a block. In general, coding a sample using "Escape mode" may generally refer coding a sample of a block that does not have a corresponding color represented in a palette for coding the block. As noted above, such samples may be referred to as escape samples or escape pixels.

Another example palette coding mode is described in a third screen content coding core experiment, subtest B.6, as described in Yu-Wen Huang et al., "Description of Screen Content Core Experiment 3 (SCCE3): Palette Mode," JCTVC-Q1123, Valencia, ES, 27 Mar.-4 Apr. 2014 (hereinafter Q1123), another mode was introduced into the software released by Canon on 26 May 2014. The macro for this mode was "CANON_NEW_RUN_LAST_TRANSITION" and may be referred to herein as Transition Run mode. The Transition Run may be similar to Value mode in that video encoder 20 or video decoder 30 may code an index value followed by a run specifying the number of subsequent samples that have the same palette index.

The difference between Value mode and the Transition Run mode is that the palette index of the transition run mode is not signaled in the bitstream. Rather, video encoder 20 and video decoder 30 may infer the palette index. As described herein, inferring a value may refer to the determination of a value without reference to dedicated syntax that represents the value that is coded in a bitstream. That is, video encoder 20 and video decoder 30 may infer a value without coding a dedicated syntax element for the value in a bitstream. The inferred index may be referred to as a transition index.

In some examples, there may be two ways of signaling the palette modes. A first technique for signaling palette modes may be referred to as explicit escape signaling. For example, in JCTVC-Q0094, if the macro "PLT_REMOVE_ESCAPE_FLAG" is zero, video encoder 20 may explicitly encode an escape flag for each sample of a block to indicate whether a sample being coded in a block is coded in Escape mode. If the sample is not coded with Escape mode, video encoder 20 may encode additional data to indicate whether the mode is CopyFromTop or Value. In some instances, the additional data may be a flag, referred to herein as an SPoint flag (e.g., an SPoint flag value of zero may indicate CopyFromTop mode and an SPoint flag value of one may indicate Value mode, or vice versa).

Hence, with the explicit escape signaling, the SPoint flag may be used to indicate a particular run type for a run of pixel values associated with the indicated mode. For example, video encoder 20 may encode an SPoint flag to indicate whether the index currently being coded and the run of subsequent palette indices being coded in a run are coded using CopyFromTop mode or Value mode. Video encoder 20 does not encode the escape flag (e.g., "PLT_REMOVE_ESCAPE_FLAG") and the SPoint flag (when necessary) for the subsequent run samples. That is, video encoder 20 and video decoder 30 may infer the values of the escape flag and SPoint flag for samples included in a run. For example, video encoder 20 and video decoder 30 may determine the value of the escape flag and SPoint flag for samples included in the run without reference to dedicated syntax that represent such values in the bitstream.

A second technique for signaling palette modes may be referred to as implicit escape signaling. For example, if the macro "PLT_REMOVE_ESCAPE_FLAG" from JCTVC-Q0094 is one, video encoder 20 and video decoder 30 may be configured to increase the number of palette entries of a palette by one to accommodate a special index to the palette that does not correspond to any palette entry. In some examples, video encoder 20 and video decoder 30 may include the additional index as the last palette index in the increased palette for a given block. The additional index may be used as an indication of Escape mode.

When performing implicit escape signaling, video encoder 20 may encode, for a particular sample value of a block, data that represents the additional index to indicate that the additional sample is coded as an escape sample (e.g., a sample that does not have a color value represented in a palette for coding the block). Video encoder 20 may also encode the color value(s) of the escape sample. Accordingly, in the case of implicit escape signaling, there are only two possible modes (e.g., CopyFromTop mode or Value mode (also referred to as Index mode)) to be signaled using explicit syntax. For example, only the SPoint flag may be signaled to distinguish between the modes. If a sample is coded in Value mode and the index for Value mode is equal to the escape index (e.g., the above-noted additional index to the palette), video encoder 20 and video decoder 30 may infer the sample to be coded as an escape sample. In this case no run is signaled. When using the implicit escape signaling with the Transition Run mode, the SPoint flag may take values 0 (e.g., Value mode), 1 (e.g., CopyFromTop mode) or 2 (e.g., Transition Run mode).

The techniques described in this disclosure may include techniques for various combinations of one or more of signaling palette-based coding modes, transmitting palettes, deriving palettes, and transmitting palette-based coding maps and other syntax elements. In some examples, the techniques of this disclosure may be used to resolve potential redundancies associated with the signaling of the palette modes, palette indices, runs and palette sizes that are present in JCTVC-Q0094 (as well as the reference software implementing the palette mode that was uploaded with the contribution JCTVC-Q0094).

In software associated with the techniques described in JCTVC-Q0094, certain signaling redundancies have already been considered and removed. For example, in JCTVC-Q0094, the SPoint flag is not signaled for samples in the first row of the block, because a block coded with the palette mode cannot typically use reconstructed samples from an above-neighboring block to predict the current block. An above-neighboring block may generally refer to a block that neighbors and is positioned above a block. Similarly, if the mode for a sample that precedes a sample currently being coded is CopyFromTop, the mode for the current pixel cannot be CopyFromTop.

This disclosure, however, recognizes other signaling redundancies and/or inefficiencies, which can be removed altogether or selectively. As described in greater detail below, the techniques improve video coding bitrate efficiency without materially effecting distortion. As one example, if the sample directly above a current sample is an escape sample, video encoder 20 and video decoder 30 may be configured not to code the current sample using CopyFromTop mode. In this case, video encoder 20 may not signal the SPoint for the sample, and video encoder 20 and video decoder 30 may infer the SPoint flag to be equal to Value mode if needed.

In another example, according to the techniques of this disclosure, if neither the previous sample nor the sample directly above the current sample in a block are escape samples and the previous and above samples have the same palette index, video encoder 20 and video decoder 30 be configured not to code the current sample using CopyFromTop mode. This is because, for CopyFromTop mode, the index of the current sample would be the same as the previous sample. If the mode for the previous sample was Value mode, the run associated with Value mode would be extended by one to incorporate the current sample. On the other hand, if the mode for the previous sample was CopyFromTop, video encoder 20 and video decoder 30 may be configured not to code the current sample using CopyFromTop mode, as noted above. Thus, in this case, video encoder 20 may not signal the SPoint flag for the current sample, and video encoder 20 and video decoder 30 may infer the SPoint flag to be equal to Value mode if needed.

In another example, according to the techniques of this disclosure, if the previous run is greater than or equal to a width of the block being coded minus one, video encoder 20 and video decoder 30 may be configured not to code the current sample using CopyFromTop mode. Since CopyFromTop mode may not follow CopyFromTop mode, as described above, video encoder 20 and video decoder 30 may infer that if the mode associated with the previous sample is coded using CopyFromTop mode, the mode from the current sample may not be coded using CopyFromTop mode. If the previous run was coded using Value mode and the previous run was greater than or equal to the width of the block minus one, video encoder 20 and video decoder 30 may be configured to determine that the palette indices for the previous sample and the sample directly above the current sample are the same (in a similar manner to the example described above). In this case, if the current sample may not have the same index, making CopyFromTop mode impossible. Thus, in this case, video encoder 20 may not signal the SPoint flag for the current sample, and video encoder 20 and video decoder 30 may infer the SPoint flag to be equal to Value mode if needed.

In another example, according to aspects of this disclosure, if the palette size is one for a block being coded when using explicit escape signaling, video encoder 20 and video decoder 30 may be configured not to code certain palette indices, such as the palette indices described in U.S. Provisional Application 61/845,824, filed Jul. 12, 2013, U.S. Provisional Application 61/899,048, filed Nov. 1, 2013, or U.S. Provisional Application 61/913,040, filed Dec. 6, 2013. In addition, video encoder 20 may be configured not to code the SPoint flag, as video encoder 20 and video decoder 30 may infer the SPoint flag to be equal to Value mode if needed. This is because, if the current sample is not coded as an escape sample (e.g., a sample that does not have a color value represented in a palette for coding the block), the palette index for the current sample is already known and derived equal to zero (as the only one possible palette index). In this case, only the run is signaled. It is not necessary to distinguish between CopyFromTop and Value modes, since both modes provide an identical result. Similarly, for the implicit escape signaling, when the palette size is two, video encoder 20 may signal the palette indices to distinguish between Value and Escape modes, but the signaling of the SPoint flag is not necessary for the same reasons as above.

The techniques of this disclosure may also be used to remove redundancies when using Value, CopyFromTop, and Transition Run Modes. Hence, the techniques may improve video coding bit rate efficiency without materially effecting distortion. In an example for purposes of illustration, a current sample is coded in Value mode and the Transition Run mode is not available for use (e.g., only CopyFromAbove and Value modes are available). In this example, when the mode for the previous sample is Value, the index of the current sample cannot be the same as that of the previous sample, otherwise the current sample is included into the previous Value mode and the run for Value mode is incremented by one. Similarly, when the mode for the previous sample is CopyFromTop, the index of the current sample to be coded cannot be the same as the one above, otherwise the current sample is coded with CopyFromTop mode and possibly the run for CopyFromTop mode would be incremented by one.

With the above-described relationship in mind, video encoder 20 and video decoder 30 may reduce the index for the current sample by one when the index is greater than the index for the previous sample (e.g., if previous sample is in Value mode) or the top sample (e.g., if previous sample is in CopyFromTop mode). This process is described in C. Gisquet et al., "AHG10: Palette Index Coding," JCTVC-Q0064. Valencia, ES, 27 Mar.-4 Apr. 2014 (hereinafter JCTVC-Q0064). Also, the number of maximum possible palette indices may be reduced by one, regardless whether the previous condition is true (current index is greater than the previous left or above palette indices). For example, when using a variable length code (e.g., such as a truncated binary code) to code the index, the number of palette entries may be reduced by one.

According to aspects of this disclosure, alternatively or additionally to the process described above, the index adjustment process in Value mode may be further modified when using the Transition Run mode. For example, according to aspects of this disclosure, if the sample is not the first sample in the block and the previous sample is not coded as an escape sample, video encoder 20 and video decoder 30 may perform the index adjustment process described below.

According to aspects of this disclosure, if the previous sample is coded in Value or Transition Run mode, video encoder 20 and video decoder 30 may be configured to decrease the number of palette entries by one. In addition, if the index value is greater than or equal to the index value of the previous sample (index or transition index), video encoder 20 and video decoder 30 may be configured to decrease the current index value by one. This disclosure may refer to this decremented value as the adjusted index value. Then, if the index value for the previous sample is not equal to the transition index and the number of palette entries is greater than one, video encoder 20 and video decoder 30 may be configured to set a variable "update" to one, otherwise set the "update" to zero. If update is equal to one, video encoder 20 and video decoder 30 may further decrease the number of palette entries by one. This disclosure may refer to the decremented number of palette entries as the adjusted palette size.

In addition, if the transition index is greater than or equal to the index value for the previous sample, video encoder 20 and video decoder 30 may be configured to decrease the transition index by one. This disclosure may refer to the decremented transition index as the adjusted transition index value. If update is equal to one and the adjusted index value is greater than the adjusted transition index value, video encoder 20 and video decoder 30 may be configured to further decrease the adjusted index value by one. Additionally, video encoder 20 and video decoder 30 may be configured to perform the last index adjustment only if the adjusted palette size is greater than one. This is because the adjusted index value may only be signaled if the adjusted palette size is greater than one.

If the adjusted palette size is greater than one, video encoder 20 may encode an indication of the adjusted index value, taking into account that the maximum possible number of palette indices may be equal to the adjusted palette size. In this case, video encoder 20 and video decoder 30 may be configured to use truncated binarization for coding, such as the truncated binary coding described herein.

In some examples, according to aspects of this disclosure, a similar process as the process described above may be performed by checking the pixel value and mode used for the pixel directly above the current sample. That is, the process described above with respect to a pixel positioned to the left of the current pixel may be performed instead for upper neighboring pixels, where the left sample value and mode described above is replaced with the above pixel value and mode.

For example, if the sample is not in the first row and the previous sample is coded in CopyFromTop mode and the sample above is not coded as an escape sample, video encoder 20 and video decoder 30 may be configured to decrease the number of palette entries by one. In addition, if the current index value is greater than or equal to the index value of the sample directly above, video encoder 20 and video decoder 30 may be configured to decrease the current index value by one. Again, this decremented index value may be referred to as the adjusted index value. Then, if the index value for the sample directly above is not equal to the transition index and the number of palette entries is greater than one, video encoder 20 may set a variable update to one, otherwise set the update to zero.

If update is equal to one, video encoder 20 and video decoder 30 may be configured to further decrease the number of palette entries by one, which may be referred to as the adjusted palette size. In addition, if the transition index is greater than or equal to the index value for the above sample, video encoder 20 and video decoder 30 may be configured to decrease the transition index by one, which may be referred to as the adjusted transition index value. If update is equal to zero and the adjusted index value is greater than the adjusted transition index value, video encoder 20 and video decoder 30 may be configured to decrease the adjusted index value by one. Additionally, the last index adjustment may be performed only if the adjusted palette size is greater than one, because the adjusted index value is typically only signaled if the adjusted palette size is greater than one.

If the adjusted palette size is greater than one, video encoder 20 may be configured to encode an indication of the adjusted index value, and may, in some examples, take the maximum possible number of palette indices equal to the adjusted palette size into account. In this case, video encoder 20 and video decoder 30 may be configured to use truncated binarization, such as the truncated binary coding described herein.

The redundancy removal in the palette index signaling in connection with the Transition Run mode is described above. However, these techniques may be combined with a Limited Run method, as described below and in U.S. Provisional Application No. 62/002,717 filed May 23, 2014 and U.S. Provisional Application No. 62/009,772, filed Jun. 9, 2014. In this case, above a certain palette index value, the run is always equal to zero and hence for those palette indices, video encoder 20 may be configured not to encode an indication of the run value. Rather, video encoder 20 and video decoder 30 may be configured to derive the run value to be equal to zero. For this combination, the techniques described above with respect to Transition Run mode remain unchanged. That is, for example, the redundancy removal techniques described above may also be used with the Limited Run mode.

Additionally or alternatively, the techniques of this disclosure may also be combined with the Limited Run technique as proposed in standard submission document Guillaume Laroche et al., "AHG10: Run Coding for Palette Mode," JCTVC-Q0066, Valencia, ES, 27 Mar.-4 Apr. 2014 (hereinafter JCTVC-Q0066). In this example, a limit index is also specified. However, one difference with the above-described limited run technique is that palette indices greater than a limit index may also have runs of one or greater. However, video encoder 20 may not signal the runs. When implementing this second Limited Run technique, the redundancy removal techniques of this disclosure may only be applied if the index value of the previous pixel is less than or equal to the limit index value, or the index value of the above pixel is less than or equal to the limit index value.

The above-described techniques are generally described with respect to a video encoder (such as video encoder 20). On the decoder side (as implemented, for example, by video decoder 30), using the same conditions as on the encoder side, video decoder 30 may also adjust the number of palette entries and the transition index. Video decoder 30 may then decode the index using the adjusted number of palette entries. The decoded index may be incremented (instead of decremented) using the same conditions as on the encoder side.

Certain techniques described reduce redundancy in instances which CopyFromTop mode is not possible, and hence signaling of the SPoint flag may be modified such that video encoder 20 and video decoder 30 may infer Value mode. According to aspects of this disclosure, the redundancy reduction techniques may be extended to the case in which Transition Run mode is also being used. In this case, CopyFromTop mode is not possible if any of the following conditions are true:
1. The sample is in the first row.
2. The mode for the previous sample is CopyFromTop.
3. The pixel above is coded in Escape mode and the sample is not in the first row and the previous sample is not coded in CopyFromTop mode.
4. The sample above and the previous sample have the same index and the previous sample is not coded in Escape mode.

The techniques of this disclosure also provide an alternative for explicitly signaling an escape flag for Escape palette mode. For example, instead of signaling the escape flag before the SPoint flag with the explicit escape signaling, according to aspects of this disclosure, the order of the flags may be swapped while also changing the semantics of those flags. In this case, video encoder 20 may signal the SPoint flag first in a bitstream. In this example, an SPoint flag that is equal to one may indicate Value mode, while an SPoint flag that is equal to zero may indicate that the palette mode for a current sample is either CopyFromTop or Escape. In addition, when the SPoint flag is equal to one, video encoder 20 may signal an escape flag to differentiate between CopyFromTop mode and Escape mode.

In the examples above, video encoder 20 and video decoder 30 may be configured to use CABAC to code at least one of the above-described flags or both of the above-described flags (e.g., the SPoint flag or the escape flag). Alternatively, video encoder 20 and video decoder 30 may be configured to code such flags using CABAC bypass mode to reduce the number of context coded bins.

As described above, CopyFromTop mode may not be possible under certain conditions. In such cases, when using an alternate signaling method (e.g., such as swapping the flags), video encoder 20 may be configured to only signal the SPoint flag without signaling the escape flag. In this case, the SPoint flag may have a different semantics. For example, an SPoint flag that is equal to one may still indicate that the mode is Value mode, but an SPoint flag that is equal to zero may indicate an Escape mode. If the SPoint flag is context-coded using CABAC, an additional separate context may be used to code SPoint flag value in cases when CopyFromTop mode is impossible. In the case of a palette size being one and an escape mode being used, as described above, video encoder 20 and video decoder 30 may be configured to skip the coding of the SPoint flag when using the alternate signaling method.

The techniques of this disclosure also provide another alternative signaling technique (e.g., relative to JCTVC-Q0094) for signaling an escape flag for Escape palette mode. For example, in JCTVC-Q0094, certain signaling redundancies have been considered and removed in the reference software. As one example, when coding a current sample, if a palette mode for a previous sample is CopyFromTop, video encoder 20 and video decoder 30 may not code the current pixel using CopyFromTop mode. Similarly, if the mode for the previous sample is Value mode with palette index "X", video encoder 20 and video decoder 30 may not code the current pixel using Value mode with the same palette index "X". At the parsing stage (e.g., when parsing syntax elements from an encoded bitstream at video decoder 30), video decoder 30 checks the above-noted conditions to determine which syntax elements are allowed in order to read the bitstream properly. This checking process may become burdensome if many such conditions are to be checked.

According to aspects of this disclosure, video encoder 20 and video decoder 30 may be configured to "reuse" the above-noted redundancies to implicitly signal Escape mode. For example, when coding a current sample of a block, if a previous sample is coded using CopyFromTop mode and the mode for the current pixel is also signaled as CopyFromTop, video decoder 30 may infer that the mode for the current block is Escape mode. That is, video encoder 20 may use the redundancy of two samples in a row being coded with CopyFromTop mode to signal Escape mode. Similarly, if the mode for the previous sample to a sample currently being coded is Value mode with palette index "X" and the signaled mode is Value mode with the same palette index "X", video decoder 30 may infer the mode for the current block to be Escape mode. Similarly, other redundancies described above may also be leveraged in this way.

In the examples described above, signaling Escape mode based on redundancies does not include all of the possible situations in which video encoder 20 may signal Escape mode. Accordingly, these techniques may be used as a complementary way to signal Escape mode. In other examples, the techniques may be imposed on the bitstream, such that Escape mode may only be signaled in these constrained situations.

The techniques of this disclosure also relate to signaling that a sample is an escape sample for a palette size that is equal to zero. For example, according to aspects of this disclosure, if a palette size of a palette associated with a block currently being coded is equal to zero when using the explicit escape signaling, video encoder 20 and video decoder 30 may be configured to infer that all of the samples in the block are coded as escape samples. That is, video encoder 20 and video decoder 30 may be configured to determine that all samples in the block are coded as escape samples (e.g., samples that do not have a color value represented in a palette for coding the block) without encoding or decoding dedicated syntax that represents the Escape mode in a bitstream. Likewise, if a palette size of a palette associated with a block currently being coded is equal to one when using implicit escape signaling (e.g., the only index of the palette is the additional index used for signaling Escape mode, as described above), video encoder 20 and video decoder 30 may be configured to infer that all of the samples in the block are coded as escape samples.

In both of the above-described examples (e.g., for both explicit and implicit escape signaling), video encoder 20 and video decoder 30 may skip the coding of certain palette-based syntax for the rest of the block. For example, for the explicit escape signaling, video encoder 20 may not signal an escape flag for samples of the block. In addition, for both the explicit and implicit escape signaling, video encoder 20 may not signal the SPoint flag (for both implicit and explicit escape signaling). That is, because all samples for the block may be inferred to be escape samples, video encoder 20 need not signal the Spoint flag to distinguish between CopyFromTop and Value modes. Video decoder 30 may likewise skip decoding such syntax, which may improve bitrate and coding efficiency.

In an alternative example, video encoder 20 and video decoder 30 may restrict the palette size to be at least one in a normative fashion. In this example, video encoder 20 may be configured to modify the signaling of the palette size so that (palette size−1) is signaled. For example, when a palette predictor is used (e.g., as described in greater detail with respect to the example of FIG. 4), for each entry of the palette predictor, video encoder 20 may encode a one bit flag to indicate whether respective palette predictor entries are included in a palette of a current block. These entries are referred as the predicted palette entries and are indicated by a palette prediction binary vector (e.g., the string of one bit flags). Video encoder 20 may also signal the number of new palette entries following the predicted entries. In other examples, video encoder 20 may signal the number of new palette entries prior to the predicted entries. In any case, if the number of the predicted palette entries is zero, video encoder 20 and video decoder 30 may be configured to code data that indicates (number of new palette entries−1) instead of coding the number of new palette entries.

In another example, video encoder 20 and video decoder 30 may be configured to restrict the palette mode such that a palette size shall not be equal to 0. For example, this restriction can be achieved as a bitstream constraint, i.e. a bitstream cannot contain a palette coded block with a palette size equal to zero.

The techniques of this disclosure also relate to signaling palette size. For example, the palette size for a current block (e.g., a CU currently being coded by video encoder 20 or video decoder 30) may be explicitly signaled (e.g., as disclosed, for example, in U.S. application Ser. No. 14/244,688, filed Apr. 3, 2014 and U.S. application Ser. No. 14/244,711, filed Apr. 3, 2014). In such examples, the palette size includes both predicted palette entries (e.g., determined using a palette predictor) and new palette entries (e.g., as explicitly signaled in the bitstream).

According to aspects of this disclosure, if the palette size is signaled, there may be no need to signal the number of new entries, as video encoder 20 and video decoder 30 may be configured to derived the number of new palette entries for a block from the number of predicted entries and the palette size (e.g., palette size−number of predicted entries=number of new entries). In addition, video encoder 20 and video decoder 30 may be configured to terminate the prediction of entries of previous palettes when the palette size is signaled and that signaled size number is reached when constructing the palette for a current block.

In some examples, the palette size may be predicted from previous palettes, and video encoder 20 may be configured to signal only the difference. Video encoder 20 and video decoder 30 may be configured to code the difference between the palette size and the predicted palette size for a block using an exponential Golomb, truncated unary or fixed length code. In some instances, video encoder 20 and video decoder 30 may be configured to make the prediction depend on (e.g., based on) the block size being coded. For example, for an 8×8 block, the palette size may be predicted from the palette associated with the latest 8×8 block coded using palette mode (e.g., the 8×8 most recently coded in scanning order prior to the current block). Likewise, video encoder 20 and video decoder 30 may be configured to predict a palette size for a 16×16 block based on a palette from a previously coded 16×16 block, and a similar relationship may be extended to blocks of other sizes. Alternatively, in another example, a palette size may be predicted from the latest block coded with less or equal size to the current block size.

The techniques of this disclosure also relate to signaling a maximum palette size and/or a maximum palette predictor size. For example, according to aspects of this disclosure, video encoder 20 and video decoder 30 may be configured to code data indicating a maximum palette size and/or a maximum palette predictor size. In some examples, video encoder 20 and video decoder 30 may be configured to code such data from an SPS. Coding data indicating a maximum palette size and/or a maximum palette predictor size may provide flexibility, e.g., allowing video encoder 20 and video decoder 30 to use palettes and palette predictors of different sizes for different profiles, levels, bit-depths, block sizes, or the like. In the context of a video coding standard, a profile may correspond to a subset of algorithms, features, or tools and constraints that apply to them. For example, a profile may be a subset of an entire bitstream syntax that is specified by a particular. A level may correspond to the limitations of decoder resource consumption, such as, for example, decoder memory and computation, which may be related to the resolution of pictures, bitrate, and block processing rate. A profile may be signaled with a profile_idc (profile indicator) value, while a level may be signaled with a level_idc (level indicator) value.

According to aspects of this disclosure, video encoder 20 and video decoder 30 may be configured to use information regarding a maximum palette size to determine the elements and flags associated with the palette mode, for example, in signaling the number of new palette entries. As an example, a maximum possible palette size may be denoted by MAX_PLT_SIZE, which may be encoded by video encoder 20 and decoded by video decoder 30. Similarly, a maximum possible size of a palette predictor vector may be denoted by MAX_PLT_PREDICTOR_SIZE, which may be encoded by video encoder 20 and decoder by video decoder 30.

As another example, according to aspects of this disclosure, video encoder 20 and video decoder 30 may code data that indicates the number of "ones" in a palette prediction binary vector (e.g., which may represent the number of entries from the palette predictor being copied to a palette for coding a current block). In some instances, video encoder 20 and video decoder 30 may be configured to code a syntax element numPredPalette to indicate the number of the predicted palette entries. If the value of numPredPalette is equal to the value of MAX_PLT_SIZE (i.e., the maximum palette size), video encoder 20 and video decoder 30 may be configured to skip the coding of the number of new palette entries altogether. Otherwise, if the value of numPredPalette is less than the value of MAX_PLT_SIZE, video encoder 20 and video decoder 30 may use a truncated binarization based on (MAX_PLT_SIZE−numPredPalette), which is the maximum possible value for the number of new palette entries, to code data indicating the number of new entries.

In general, truncated binarization may include any technique that uses information about a maximum possible value of a particular parameter being signaled (e.g., such as the number of new palette entries) by decreasing the length of some codewords used in the binarization method of the parameter while maintaining unique decodability. For example, video encoder 20 and video decoder 30 may be configured to construct a truncated binary code using a maximum value of a given parameter (e.g., such as the number of new palette entries). Example techniques for truncated binary coding are described in various articles about truncated binary coding, such as in the entry related to truncated binary encoding available via the online encyclopedia "Wikipedia."

Similarly, video encoder 20 and video decoder 30 may use truncated unary or exponential Golomb or Golomb-Rice codes to signal and decode the number of new palette entries, based on a maximum possible value of the number of new palette entries. For example, if (MAX_PLT_SIZE−numPredPalette)=3, then video encoder 20 may use a truncated unary code to signal three as 000 instead of 0001 (e.g., as would be signaled when using regular unary code). In case of the truncated exponential Golomb or Golomb-Rice codes, video encoder 20 and video decoder 30 may be configured to reduce the length of the prefix for the interval that contains the maximum value by one. Thus, video encoder 20 and video decoder 30 may be configured to change the prefix from 000 . . . 001 to 000 . . . 000. Similarly, video encoder 20 and video decoder 30 may be configured to reduce the number of suffix bits in the binarization method for that interval depending on the maximum value.

For large blocks (and/or large CUs), the palette size tends to be the maximum palette size. Therefore, in some cases, video encoder 20 and video decoder 30 may be configured to map the binarization of (MAX_PLT_SIZE−numPredPalette) in the inverse of the usual way, that is, with the shorter codeword lengths assigned to the larger values of (MAX_PLT_SIZE−numPredPalette), and the longer codeword lengths assigned to the smaller values of (MAX_PLT_SIZE−numPredPalette). In some examples, instead of using 0's followed by a 1 to signal unary/truncated unary codes, or as a prefix of Golomb-Rice or exponential Golomb or concatenated Golomb-Rice and exponential Golomb family of codes, video encoder 20 and video decoder 30 may be configured to use 1's followed a 0.

Furthermore, other variations are possible. For example, video encoder 20 and video decoder 30 may be configured to interpret the first bit in such codes as a flag to indicate whether the number of new entries is zero or non-zero. Video encoder 20 and video decoder 30 may be configured to interpret the remaining bits as a number of new palette entries minus 1. In an example for purposes of illustration, a maximum value of new palette entries may be eight and the number of new palette entries may be three. Using truncated unary code, video encoder 20 and video decoder 30 may be configured to determine the binarization to be 0001. If video encoder 20 and video decoder 30 are configured to interpret the first bit as a flag (e.g., 0: one or more new palette entries, 1: zero new palette entries), the rest of the bits (001) indicate that there are two new palette entries. When using truncated codes, video encoder 20 and video decoder 30 may be configured to adjust the maximum value downwards by one.

In other examples, video encoder 20 and video decoder 30 may be configured to interpret the above-described flag in reverse. In this case, video encoder 20 and video decoder 30 may be configured to interpret a flag value of 1 as one or more new palette entries and a flag value of 0 as zero new palette entries. In such a case, the bits for signaling three new palette entries with a maximum value of eight are 1001.

In other examples, the concept of the above-described flag may be extended to other codes such as exponential Golomb, Golomb-Rice, or the like. For example, when the maximum value for new palette entries is non-zero, video encoder 20 may be configured to signal a flag that indicates whether there are non-zero new entries. If the flag indicates that there are non-zero new entries, number of new entries minus one may be is signaled using exponential Golomb, Golomb-Rice, concatenation of exponential Golomb and Golomb-Rice or similar codes or their truncated versions. When truncated versions are used, the maximum value may be adjusted downwards by one.

In some examples, the flag may be context-coded using CABAC, whereas the rest of the bins (e.g., for new palette entries minus 1) may be bypass coded. Alternatively, the flag as well as the rest of the bins (for new palette entries minus 1) may all be bypass coded. In some instances, a fixed number of prefix bins from the code for the new palette entries minus 1 may be context-coded using CABAC and the rest of the bins may be bypass coded.

According to aspects of this disclosure, as noted above, the syntax element MAX_PLT_SIZE may be signaled in a parameter set, such as an SPS. In other examples, the syntax element MAX_PLT_SIZE may be signaled in a VPS, picture parameter set (PPS), slice header, at a block level (e.g., with syntax signaled for an LCU or CU), or elsewhere. In some examples, according to aspects of this disclosure, different maximum palette sizes may be specified for different block sizes. In other examples, the maximum palette size may depend on a profile or the bit-depth of the video data being coded. For example, for a larger input bit-depth (or profile bit-depth), the syntax element MAX_PLT_SIZE may be used to specify a relatively larger maximum palette size. In still other examples, the maximum palette size may additionally or alternatively depend on the chroma format of the video data being coded. For example, the syntax element MAX_PLT_SIZE may be used to specify a relatively smaller maximum palette size for monochrome inputs than for 4:2:0 chroma sub-sampling formats, which may, in turn, have smaller sizes than 4:4:4 chroma sub-sampling formatted inputs.

According to aspects of this disclosure, instead of signaling the syntax element MAX_PLT_SIZE in the manner described above, data that indicates (MAX_PLT_SIZE−1) may be signaled, because a MAX_PLT_SIZE syntax element that is equal to zero may be invalid due to disabling the palette completely.

In an another example, instead of signaling a separate flag at the VPS. SPS, PPS, or slice header level to enable/disable palette mode, video encoder 20 may be configured to only signal the MAX_PLT_SIZE syntax element. In this example, video encoder 20 and video decoder 30 may be configured to interpret a MAX_PLT_SIZE syntax element of 0 as disabling palette mode. That is, upon receiving a palette size syntax element (e.g., the MAX_PLT_SIZE syntax element) video decoder 30 may determine that palette mode has been disabled based on the syntax element. The MAX_PLT_SIZE syntax element or (MAX_PLT_SIZE−1) may be signaled using fixed length codes (assuming a normative limit on MAX_PLT_SIZE) or Golomb-Rice or exponential Golomb codes.

As noted above, the techniques of this disclosure also include coding data that indicates a maximum palette predictor size. For example, according to aspects of this disclosure, video encoder 20 and video decoder 30 may be configured to code a MAX_PLT_PREDICTOR_SIZE syntax element in the VPS, SPS, PPS, slice header, at a block level or elsewhere that indicates a maximum palette predictor size. In some examples, instead of signaling the MAX_PLT_PREDICTOR_SIZE syntax element, (MAX_PLT_PREDICTOR_SIZE−1) may be signaled. In still other examples, video encoder 20 and video decoder 30 may be configured to code other data that indicates a maximum palette predictor size.

In the particular examples described herein, the MAX_PLT_PREDICTOR_SIZE syntax element or (MAX_PLT_PREDICTOR_SIZE−1) may be signaled using fixed length codes (e.g., assuming a normative limit on MAX_PLT_PREDICTOR_SIZE) or Golomb Rice or exponential Golomb codes. In some examples, video encoder 20 and video decoder 30 may be configured to assume (e.g., automatically determine) that the size indicated by the MAX_PLT_PREDICTOR_SIZE syntax element is greater than or equal to a maximum palette size (e.g., as indicated by a MAX_PLT_SIZE syntax element). In this example, video encoder 20 and video decoder 30 may be configured to code (MAX_PLT_PREDICTOR_SIZE−MAX_PLT_SIZE) using fixed length codes or Golomb-Rice or exponential Golomb codes. Accordingly, according to aspects of this disclosure, video encoder 20 and video decoder 30 may be configured to code data indicating a delta (e.g., difference) between the maximum palette predictor size and the maximum palette size.

In examples in which the maximum palette size and maximum palette predictor size are signaled at the SPS level, video encoder 20 and video decoder 30 may be configured to code data that indicates the number of new entries using a truncated unary code. The number of new entries plus the number of entries predicted from the palette predictor together may not exceed the maximum palette size signaled in the SPS. However, if the maximum palette size signaled in the SPS is relatively large, the number of new entries may exceed 31. In this instance, the truncated unary code exceeds a 32-bit length, which may be undesirable for software and hardware implementations.

To address this, according to aspects of this disclosure, in one example, video encoder 20 and video decoder 30 may be configured to restrict the number of new entries so that length of the code for signaling the number of new entries does not exceed 32. For example, if a unary or truncated unary code is used to signal the number of new entries, the number of new entries may be restricted to 31. It should be understood that a length restriction of 32 is merely one example (e.g., other length restrictions may alternatively be used).

In the HEVC screen content coding extensions text specification draft 2, (Rajan Joshi et al., "High Efficiency Video Coding (HEVC) Screen Content Coding: Draft 2," JCTVC-S1005, Sapporo, JP, 30 Jun.-9 Jul. 2014 (hereinafter JCTVC-S1005), truncated unary code is used to signal the number of new palette entries with the maximum value equal to maximum palette size signaled in the SPS (palette_max_size) minus the number of palette entries that are predicted from the palette predictor. Using the proposed restriction, the maximum value may be modified to be the smaller of 32 and the difference between the maximum palette size signaled in the SPS (palette_max_size) and the number of palette entries predicted from the palette predictor. If such a modification to the maximum value is performed and the truncated unary coding of JCTVC-S1005 is used, the maximum number of new palette entries may be 32 (instead of 31) without the length of the code exceeding 32 bits.

In some examples, instead of truncated unary coding, if video encoder 20 and video decoder 30 are configured use another code such as exponential Golomb or its truncated version, the maximum allowable new palette entries may be modified appropriately so that the length does not exceed 32. If there are a number of values that have a codeword length of 32, video encoder 20 and video decoder 30 may be configured to choose the highest of such value to be the maximum allowable value for the number of new palette entries.

The restriction described herein on the maximum number new palette entries may be made a normative restriction. For example, video encoder 20 may be configured to generate a bitstream with the constraint and video decoder 30 may be configured to rely on the constraint in a conforming bitstream.

According to aspects of this disclosure, in one example, the semantics of the palette_num_signaled_entries syntax element may be changed relative to JCTVC-S1005 as follows: the syntax element palette_num_signaled_entries specifies the number of entries in the current palette that are explicitly signaled. The value of the syntax element palette_num_signaled_entries shall be in the range of 0 to 31, inclusive. When the syntax element palette_num_signaled_entries is not present, it is inferred to be equal to 0.

In addition, the value of the variable CurrentPaletteSize specifies the size of the current palette and is derived as follows:
If palette_share_flag [x0][y0] is equal to 1,
CurrentPaletteSize=PreviousPaletteSize (7-71)
Otherwise (palette_share_flag [x0][y0] is equal to 0)
CurrentPaletteSize=paletteNumPredictedEntries+palette_num_signaled_entries(7-72)
In the example above, the value of CurrentPaletteSize shall be in the range of 0 to palette_max_size, inclusive.

According to aspects of this disclosure, if the maximum value is modified in the above described manner, the value of the syntax element palette_num_signaled_entries may be modified such that the value shall be in the range of 0 to 32, inclusive.

In another example, the maximum palette size may be signaled in the SPS and may be limited to 31. Limiting the size may be accomplished by enforcing an upper limit on the palette_max_size syntax element in the semantics of the palette_max_size syntax element, such that the palette_max_ size syntax element specifies the maximum allowed palette size. The value of the palette_max_size syntax element shall be in the range of 0 to 31, inclusive. When not present, the value of the palette_max_size syntax element is inferred to be 0. In some examples, instead of 31, the value may be restricted to 32.

In another example, the maximum value of the palette_max_size syntax element may be restricted so that if the number of new palette entries is equal to palette_max_size, video encoder 20 and video decoder 30 may be configured to code the number of new palette entries using a code that does not exceed 32 bits. In still another example, the maximum value of number of new palette entries may always be limited to 31, regardless of the code used to code the maximum value. In still another example, the maximum value may be limited to 32.

The techniques of this disclosure also relate block-level escape signaling (e.g., for a CU or LCU). For example, according to aspects of this disclosure, one or more syntax elements may indicate, at block-level (e.g., a CU level), whether any of the samples of the block are coded as an escape sample (e.g., a sample that does not have a color value represented in a palette for coding the block). As noted above, the one or more syntax elements may be referred to as block-level escape syntax. Again, block-level syntax may refer to syntax that is coded or determined with a block of video data, such as a CU or LCU, and not syntax that may be included in a slice header or with individual pixels of video data.

In instances in which at least one sample in a block of samples coded using palette coding is coded as an escape sample, the techniques of this disclosure may be used to signal existence of such mode. In example for purposes of illustration, video encoder 20 and video decoder 30 may be configured to code a flag (which may be referred to as a block-level escape flag) that indicates whether any of the samples of the block being coded are coded as an escape sample. In some instances, a flag value of zero may indicate that none of the samples or pixels of the block are coded as escape samples. A flag value of one may indicate that at least one sample or pixel of the block is coded as an escape sample. Hence, the block-level escape syntax may indicate, for all samples of a block of video data, whether at least one sample of the block is coded with without using an index to a palette of color values for the block, e.g., is coded using Escape mode.

According to aspects of this disclosure, the above described syntax may achieve a bit savings relative to techniques of signaling escape samples without a block-level indication. For example, in instances in which the syntax indicates that no samples of a block are coded as escape samples, (e.g., the above-described flag is zero), video encoder 20 and video decoder 30 may not code any other syntax associated with escape samples for the block. For example, with respect to the explicit escape signaling described herein, video encoder 20 and video decoder 30 may skip the coding of the sample-level escape mode flags. With respect to the implicit escape signaling, video encoder 20 and video decoder 30 may skip the coding of the additional index for the palette that indicates the escape sample. In this example, video encoder 20 and video decoder 30 may only code an SPoint flag to distinguish between CopyFromTop mode and Value mode.

In some examples, the above-described flag may be signaled before the palette entries for a block or CU currently being coded. In other examples, the above-described flag may be signaled after the palette entries for a block or CU currently being coded. In some examples, video encoder 20 and video decoder 30 may be configured to context code the above-described flag. In such examples, video encoder 20 and video decoder 30 may determine the contexts based on the block or CU size and/or the palette size for the current block or CU.

In some instances, the usage of escape samples may vary by block size. For example, the use of escape samples may be less prevalent in relatively small blocks. In such instances, video encoder 20 and video decoder 30 may be configured to determine that a block does not include any escape samples and skip the coding of the above-described flag, thereby achieving a bit savings. For example, according to aspects of this disclosure, video encoder 20 and video decoder 30 may not code the block-level flag for 8×8 blocks, where escape samples are much more unlikely to be used than in larger block sizes. Similarly, for large block sizes (e.g., blocks of 64×64 pixels or larger), video encoder 20 and video decoder 30 may be configured to determine that there are always samples coded as escape samples. In such instances, video encoder 20 and video decoder 30 may infer that the block-level escape flag for a block is equal to one (e.g., at least one sample is an escape sample) and skip the coding of the block-level escape flag (e.g., an indication of the block-level escape flag is not included in the bitstream).

The techniques of this disclosure also relate to coding a block of samples based on whether any samples of a block are coded as escape samples. For example, as noted above, the techniques of this disclosure may be used to indicate whether any samples are coded as escape samples of a palette-coded block. In instances in which a block does not include escape samples and when the size of a palette is one, video encoder 20 and video decoder 30 may be configured to automatically determine that all samples of the block have the same index value (e.g., the only entry of the palette). Video encoder 20 and video decoder 30 may also, therefore, skip the coding of other all other data used to determine palette indices of the block. For example, video encoder 20 and video decoder 30 may skip the coding of the SPoint flag, index signaling, and data associated with runs of palette indices.

In an example for purpose of illustration, video decoder 30 may decode a block-level escape flag that indicates that there are no samples in the current block that are coded as escape samples (e.g., the flag is equal to zero). Video decoder 30 may also decode data that indicates the palette for the block has a single entry (e.g., data indicating that the palette size is one) or decode a palette that has a single entry. In this example, based on both conditions evaluating to true (e.g., no samples are escape samples and the palette size is one), video decoder 30 may automatically determine that all of the palette indices of the block are equal to the single entry included in the palette. Video decoder 30 may also skip the decoding of other data used to determine palette indices of the block (e.g., such as SPoint flags, palette indices, and run information).

In another example, according to aspects of this disclosure, when a palette size is one, runs of samples coded with palette index zero may be terminated by escape samples. That is, a run of palette indices may be interrupted by a position being coded as an escape sample. In this example, video encoder 20 and video decoder 30 may be configured to skip the coding of the SPoint flag. In addition, in this example, video encoder 20 and video decoder 30 may be configured to infer that the mode for the palette indices is Value mode as well as the index of Value mode (e.g., with only one entry in the palette, it may not be necessary to signal the index for Value mode). In this example, video encoder 20 and video decoder 30 may infer that the sample immediately following a run is coded as an escape sample and skip the coding of escape related syntax.

The techniques of this disclosure also relate to coding data indicating a run value of a run of palette indices in palette coding. For example, as noted above, a run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Value mode, video encoder 20 and video decoder 30 may code an index value and a run value that indicates a number of consecutive samples in a scan order that have the same index value and that are being coded with the index value. With respect to CopyFromTop mode, video encoder 20 and video decoder 30 may code an indication that an index for the current sample value is copied based on an index of an above-neighboring sample (e.g., a sample that is positioned above the sample currently being coded in a block) and a run value that indicates a number of consecutive samples in a scan order that also copy an index value from an above-neighboring sample and that are being coded with the index value.

For example, according to aspects of this disclosure, data indicating a run of palette indices in a block of video data may be coded based on a maximum possible run value for the block. That is, video encoder 20 and video decoder 30 may determine, for a pixel associated with a palette index that relates a value of the pixel to a color value in a palette, a run length of a run of palette indices being coded with the palette index of the pixel. Video encoder 20 and video decoder 30 may also determine a maximum run length for a maximum run of palette indices able to be coded with the palette index of the pixel. Video encoder 20 and video decoder 30 may then code data that indicates the run length based on the determined maximum run length.

In an example for purposes of illustration, the total number of samples in a block of video data may be N and each of samples may be indexed from 0 to (N−1). For the sample with position j, video encoder 20 and video decoder 30 may determine the maximum possible run value as (N−j−1). It should be noted that the run value indicates the number of subsequent samples being coded with the same palette coding mode (e.g., Value mode or CopyFromTop mode) as the current sample. According to aspects of this disclosure, video encoder 20 and video decoder 30 may be configured to code data indicating the run value using a truncated binarization, taking into account the maximum possible run value. In general, truncated binarization may include any technique that uses information about a maximum possible value of a particular parameter being signaled (e.g., such as the number of new palette entries) by decreasing the length of some codewords used in the binarization method of the parameter while maintaining unique decodability. For example, a truncated binary code based on the maximum possible value of a run may be used. Similarly, truncated unary or exponential Golomb or Golomb Rice codes may be used to code and decode the run value, based on the maximum possible value of a run. In some examples, the truncated binarization may be a combination of exponential Golomb and Golomb-Rice codes.

For example, a $k^{th}$ order Exp-Golomb (EGk) code word is composed of two parts, a prefix and a suffix. For a given unsigned integer x, the prefix part of the EGk code word consists of a unary code corresponding to the value of:

$$l(x) = \left\lfloor \log_2\left(\frac{x}{2^k} + 1\right) \right\rfloor$$

The suffix part is computed as the binary representation of $x-2^k(2^{l(x)}-1)$ using $k+l(x)$ bits.

As an example, Table 1 below includes several code words for EG0.

TABLE 1

EG0 Example

| Value x | Code word (prefix-suffix) | Code word length |
|---|---|---|
| 0 | 1 | 1 |
| 1 | 01-0 | 3 |
| 2 | 01-1 | 3 |
| 3 | 001-00 | 5 |
| 4 | 001-01 | 5 |
| 5 | 001-10 | 5 |
| 6 | 001-11 | 5 |

In U.S. Provisional Application No. 62/019,223, filed Jun. 20, 2014, a run value is coded using $2^{nd}$ order Exp-Golomb code.

According to aspects of this disclosure, video encoder 20 and video decoder 30 may be configured to code data indicating a run value using a truncated Exp-Golomb code. For example, a $k^{th}$ order truncated Exp-Golomb (TEGk) code word is also composed of two parts, a prefix and a suffix. The prefix may be a unary prefix and the suffix may be a binary suffix. For example, for a given unsigned integer x and its largest possible run value Xmax (e.g., the maximum run length), the prefix part of the EGk code word consists of a truncated unary code corresponding to the value of:

$$l(x) = \left\lfloor \log_2\left(\frac{x}{2^k} + 1\right) \right\rfloor$$

Specifically, the "trailing one" of the unary code can be avoided if:

$$\left\lfloor \log_2\left(\frac{X\max}{2^k} + 1\right) \right\rfloor == l(x).$$

If the prefix is truncated, i.e., $$\left\lfloor \log_2\left(\frac{X}{2^k} + 1\right) \right\rfloor == l(x),$$

the suffix part of TEGk is computed as the truncated binary representation of $x-2^k(2^{l(x)}-1)$ using $k+l(x)$ or $k+l(x)-1$ bits. The maximum symbol value for the input of truncated binary code is $X\max-2^k(2^{l(x)}-1)$.

If the prefix is not truncated, the suffix part of TEGk is the same as EGk, i.e. binary representation of $x-2^k(2^{l(x)}-1)$ using $k+l(x)$ bits. As an example, Table 1 below includes several code words for TEG0.

TABLE 2

TEG0 Examples (X = 5)

| Value x | Code word (prefix-suffix) | Code word length |
|---|---|---|
| 0 | 1 | 1 |
| 1 | 01-0 | 3 |
| 2 | 01-1 | 3 |
| 3 | 00-0 | 3 |
| 4 | 00-01 | 4 |
| 5 | 00-10 | 4 |

While the example of Table 2 above illustrates that prefix as being a number of zeros followed by a trailing one (e.g., 00 . . . 1_), it should be understood that in other examples, video encoder 20 and video decoder 30 may code a number of ones followed by a trailing zero (e.g., 11 . . . 0).

According to aspects of this disclosure, video encoder 20 and video decoder 30 may code a run value using the TEGk code described above. In some examples, video encoder 20 and video decoder 30 may, for a current pixel position in a block (or CU), determine the maximal run value Xmax based on the equation (Xmax=number of pixels in the current CU−current position in scanning order−1).

In another example, if the run value is first coded using a truncated unary prefix, video encoder 20 and video decoder 30 may be configured to adjust the maximum run value accordingly, e.g., based on the truncated value. For example, in some instances, video encoder 20 and video decoder 30 may be configured to code a run value as a series of three flags: greater than zero, greater than one, and greater than two. In this example, if the signaled run is greater than two, video encoder 20 and video decoder 30 may code the remaining value (e.g., run value−3), potentially with another binarization method such as a combination of exponential Golomb and Golomb-Rice codes or the TEGk code described above.

However, if (N−j−1) is equal to 0, video encoder 20 and video decoder 30 do not code a run. Likewise, if (N−j−1) is equal to one, video encoder 20 and video decoder 30 may only code the greater than zero flag. Likewise, if (N−j−1) is equal to two, video encoder 20 and video decoder 30 may only code the greater than zero and the greater than one flags. Likewise, if (N−j−1) is equal to three, video encoder 20 and video decoder 30 may only code the greater than zero flag, the greater than one flag, and the greater than two flag. If (N−j−1) is more than three, in addition to greater than zero flag, the greater than one flag, and the greater than two flag, video encoder 20 and video decoder 30 may code the remaining value up to a maximum value of (N−j−4). In a similar way, the described process may be extended to use a number of flags other than the three, for example, flags indicating a signaled value greater than number M, where M may be a non-negative value starting from zero.

According to aspects of this disclosure, in the example above, video encoder 20 and video decoder 30 may code the remaining run length using the TEGk code described above, with a maximum run value equal to (number of pixels in the current CU−current position in scanning order−4). In another example, video encoder 20 and video decoder 30 may be configured to code a flag that indicates whether the run value is greater than zero and the remaining value as the run length minus one. For example, video encoder 20 and video decoder 30 may code the greater than zero flag. Video encoder 20 and video decoder 30 may also code data that indicates the run length minus one using the TEGk code with a maximum value for the TEGk code set equal to the maximum run length minus one. In one example, video encoder 20 and video decoder 30 may set k equal to zero, such that the TEGk code is a TEG0 code.

In other examples, video encoder 20 and video decoder 30 may use any order of the above-described TEG code for coding syntax elements for palette coding. In an example, video encoder 20 and video decoder 30 may set k equal to two, such that the TEGk code is a TEG2 code.

While the examples above are described with respect to coding a run value in palette coding, video encoder 20 and video decoder 30 may be configured to use the codes (such as the TEGk code) to code other syntax for palette coding. For example, as described in greater detail below, video encoder 20 and video decoder 30 may use the above-described codes for coding a binary palette prediction vector, a CopyAbove run length, or other values.

In Joshi et al., "Non-SCCE3: Contexts for coding index runs," Joint Collaborative Team on Video Coding (JCT-VC) of ITU-T SG 16 WP 3 and ISO/IEC JTC I/SC 29/WG 11, 18 Meeting, Sapporo, JP 30 Jun.-9 Jul. 2014, JCTVC-R0174 (hereinafter JCTVC-R0174), the authors proposed to make the contexts of the run-length codewords depend on the index if CopyLeft mode (e.g., which may operate in a similar manner to CopyFromTop mode) is used. However, in accordance with an example of this disclosure, if the current run mode is CopyFromAbove, video encoder 20 and video decoder 30 may determine contexts for CABAC coding the run based on the index value of the pixel that is positioned above the pixel currently being coded. In this example, the above-neighboring pixel is outside of the current CU, video encoder 20 and video decoder 30 may determine that the corresponding index is equal to a predefined constant k. In some examples, the constant k may be equal to zero.

In some examples, if the palette mode for coding a current pixel is CopyFromAbove mode, video encoder 20 and video decoder 30 may select one of two candidate CABAC contexts to code the first bin of the run length codeword based on whether the above-neighboring pixel has an index that is equal to zero. As another example, if the palette mode for coding a current pixel is CopyPrevious mode, video encoder 20 and video decoder 30 may select one of four candidate CABAC contexts to code the first bin of the run length codeword based on based on whether the index is equal to zero, one, two, or larger than two.

Figure 2:
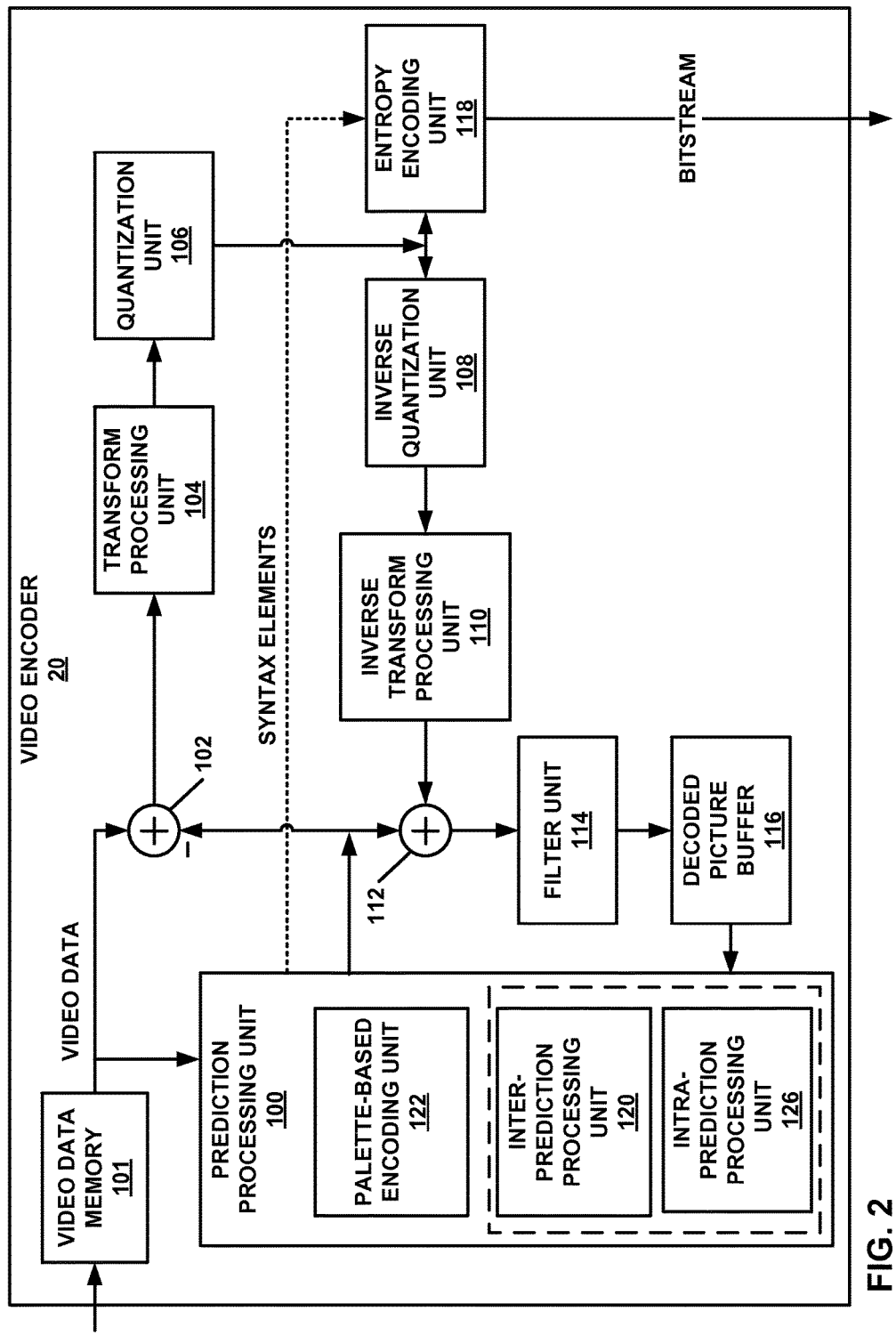
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette-based coding. Non-palette-based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described herein. For example, according to aspects of this disclosure, palette-based encoding unit 122 may determine a value of a syntax element that indicates, for all samples of a block of video data, whether at least one respective sample of the block is coded with a first palette mode, where the first palette mode includes coding the respective sample of the block without using an index to a palette of color values for the block. For example, palette-based encoding unit 122 may determine a value of a block-level syntax element that indicates whether any sample of the block is encoded as an escape sample (as a sample that does not have a color value represented in a palette for coding the block). In some examples, palette-based encoding unit 122 may determine an escape flag for a block that indicates whether any sample of the block is encoded as an escape samples.

Additionally or alternatively, palette-based encoding unit 122 may determine at least one of data that indicates a maximum palette size of a palette of color values for coding a block of video data or data that indicates a maximum palette predictor size of a palette predictor for determining the palette of color values. For example, palette-based encoding unit 122 may include such data in a parameter set, such as an SPS.

Additionally or alternatively, palette-based encoding unit 122 may determine, for a pixel associated with a palette index that relates a value of the pixel to a color value in a palette of colors for coding the pixel, a run length of a run of palette indices being coded with the palette index of the pixel. That is palette-based encoding unit 122 may determine that an index value for a particular sample is being encoded with a run of other subsequent palette indices.

Palette-based encoding unit 122 may also determine a maximum run length for a maximum run of palette indices able to be encoded with the palette index of the pixel. As described in greater detail below with respect to entropy encoding unit 118, video encoder 20 may encode data that indicates the run length based on the determined maximum run length.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma. Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be processed as a transform coefficient block.

Quantization unit 106 may quantize the transform coefficients in a coefficient block. The quantization process may reduce the bit-depth associated with some or all of the transform coefficients. For example, an n-bit transform coefficient may be rounded down to an m-bit transform coefficient during quantization, where n is greater than nm. Quantization unit 106 may quantize a coefficient block associated with a TU ofa CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

According to aspects of this disclosure, entropy encoding unit 118 may be configured to code palette data using a TEGk code, as described above with respect to the example of FIG. 1. In particular, according to aspects of this disclosure, entropy encoding unit 118 may encode data that indicates a run length for a run of palette indices based on a determined maximum run length. In some examples, entropy encoding unit 118 may encode the run length using a TEG2 code.

Figure 3:
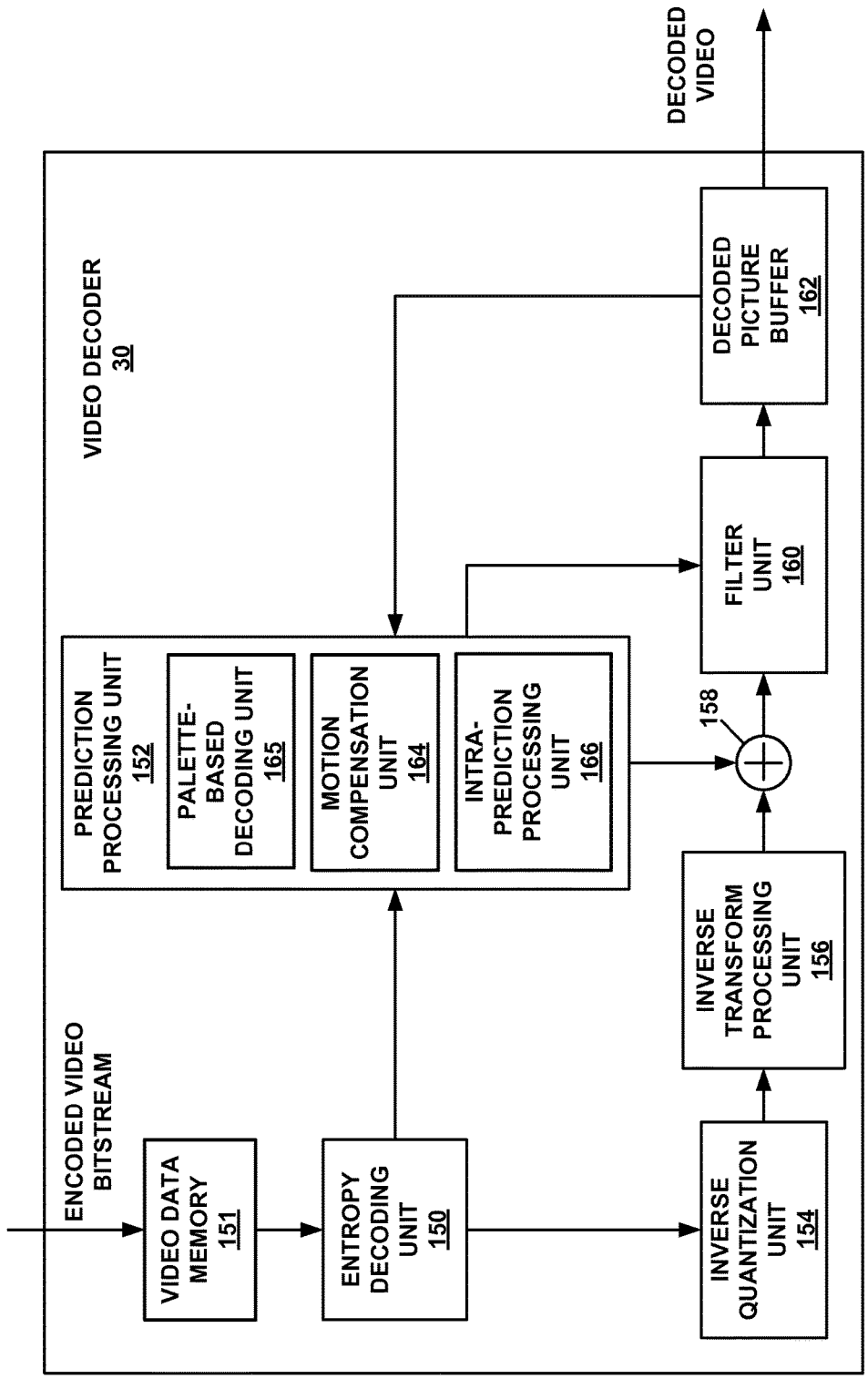
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively decode various blocks of video data, such as CUs or PUs in HEVC coding, using either palette-based coding or non-palette-based coding. Non-palette-based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette-based on the information, and reconstruct pixel values of the block based on the selected pixel values in the palette.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units.

According to aspects of this disclosure, entropy decoding unit 150 may be configured to decode palette data using a TEGk code, as described above with respect to the example of FIG. 1. In particular, according to aspects of this disclosure, entropy decoding unit 150 may decode data that indicates a run length for a run of palette indices (e.g., a run of indices having the same value or a run of indices that are copied from above-neighboring indices) based on a determined maximum run length. In some examples, entropy decoding unit 150 may decode the run length using a TEG2 code.

Prediction processing unit 152, inverse quantization unit 154, inverse transform processing unit 156, reconstruction unit 158, and filter unit 160 may generate decoded video data based on the syntax elements extracted from the bitstream. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette-based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, video decoder 30 may decode block of video data using a non-palette-based coding mode, e.g., such an HEVC inter-predictive or intra-predictive coding mode. The block of video data may be, for example, a CU or PU generated according to an HEVC coding process.

According to aspects of this disclosure, palette-based decoding unit 165 may be configured to perform any combination of the techniques for palette coding described herein. For example, according to aspects of this disclosure, palette-based decoding unit 165 may determine a value of a syntax element that indicates, for all samples of a block of video data, whether at least one respective sample of the block is coded with a first palette mode, where the first palette mode includes coding the respective sample of the block without using an index to a palette of color values for the block. For example, palette-based decoding unit 165 may determine a value of a block-level syntax element that indicates whether any sample of the block is to be decoded as an escape sample (e.g., a sample that may not be reconstructed using a color entry from the palette). In some examples, palette-based decoding unit 165 may determine a one bit escape flag for a block that indicates whether any samples of the block is to be decoded as an escape sample.

Additionally or alternatively, palette-based decoding unit 165 may determine at least one of data that indicates a maximum palette size of a palette of color values for coding a block of video data or data that indicates a maximum palette predictor size of a palette predictor for determining the palette of color values. For example, palette-based decoding unit 165 may decode such data from a parameter set, such as an SPS.

Additionally or alternatively, palette-based decoding unit 165 may determine, for a pixel associated with a palette index that relates a value of the pixel to a color value in a palette of colors for coding the pixel, a run length of a run of palette indices being coded together with the palette index of the pixel (e.g., a run of indices having the same value or a run of indices that are copied from above-neighboring indices). That is, palette-based decoding unit 165 may determine that an index value for a particular sample is decoded with a run of other subsequent palette indices. Palette-based decoding unit 165 may also determine a maximum run length for a maximum run of palette indices able to be decoded with the palette index of the pixel. As noted above with respect to entropy decoding unit 150, video decoder 30 may decode data that indicates the run length based on the determined maximum run length.

Figure 4:
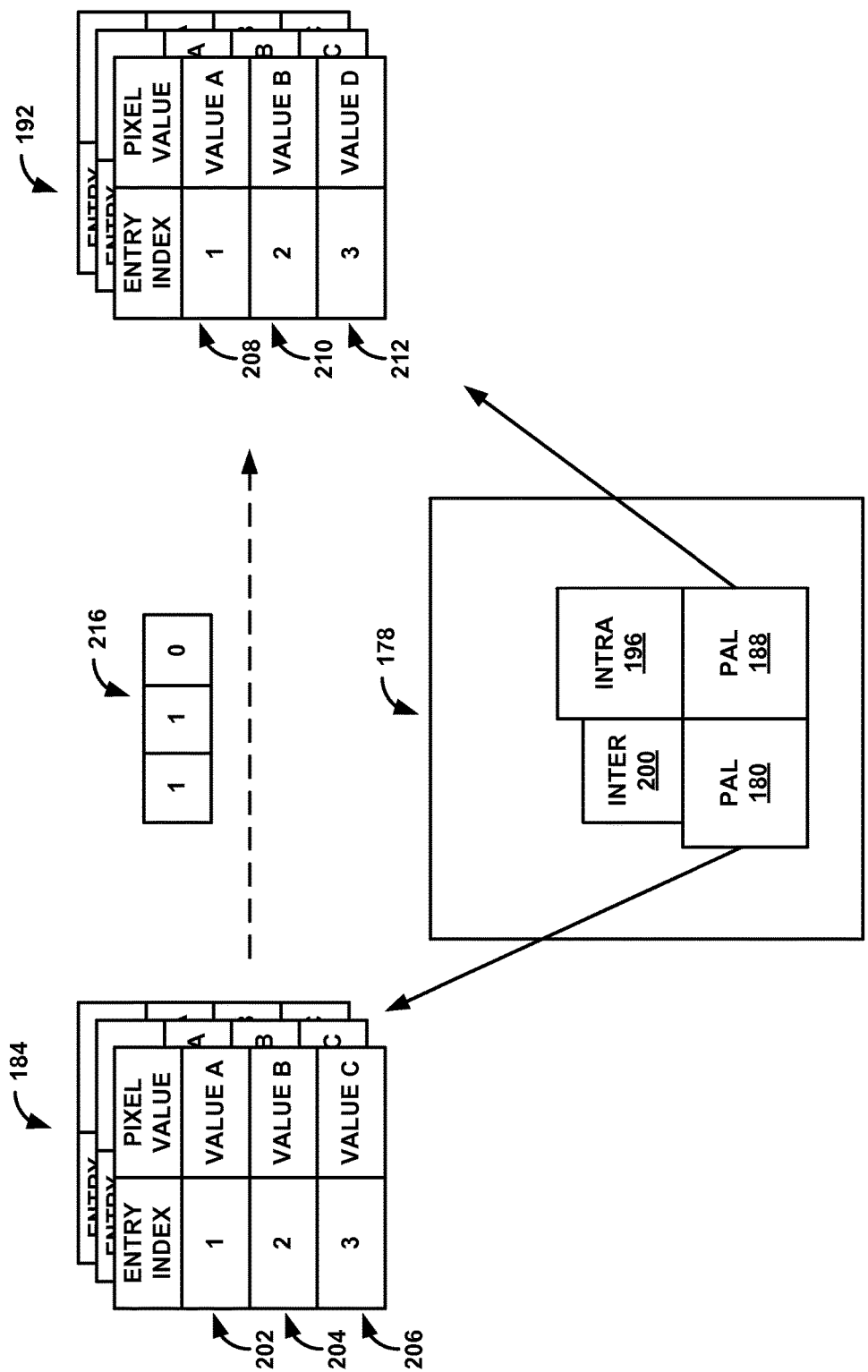
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including $Y_i$, $U_i$, and $V_i$. In this case, the palette includes values for each of the components of the pixels. Accordingly, the representation of first palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the palette indices to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the palette indices 1-3. That is, for each pixel position of first CU 180, video encoder 20 may encode an index value for the pixel, where the index value is associated with a pixel value in one or more of first palettes 184. Video decoder 30 may obtain the palette indices from a bitstream and reconstruct the pixel values using the palette indices and one or more of first palettes 184. Thus, first palettes 184 are transmitted by video encoder 20 in an encoded video data bitstream for use by video decoder 30 in palette-based decoding.

According to aspects of this disclosure, a maximum palette size may be signaled for first palettes 184. For example, according to aspects of this disclosure, video encoder 20 and video decoder 30 may be configured to code data indicating a maximum palette size, e.g., in terms of the number of entries that may be included in first palettes 184. In some examples, one or more syntax elements that indicate the maximum palette size (e.g., MAX_PLT_SIZE) may be included in an SPS that is active for CU 180. In other examples, one or more syntax elements that indicate the maximum palette size may be included in another parameter set, such as a VPS or PPS, or in header data such as slice header data or data associated with an LCU or CU.

In some examples, video encoder 20 and video decoder 30 may vary, using the one or more syntax elements that indicate the maximum palette size, the maximum palette size may be based on the particular profile, level, or bit-depth of the video data being coded. In other examples, video encoder 20 and video decoder 30 may vary, using the one or more syntax elements that indicate the maximum palette size, the maximum palette size may be based on a size of the block being coded, such as CU 180.

In an example for purposes of illustration, video encoder 20 and video decoder 30 may use the data indicating a maximum palette size when constructing first palettes 184 for CU 180. For example, video encoder 20 and video decoder 30 may continue to add entries to first palettes 184 until reaching the maximum palette size indicated by the data. Video encoder 20 and video decoder 30 may then code CU 180 using the constructed first palettes 184.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette.

In the example of FIG. 4, second palettes 192 include three entries 208-212 having entry index value 1, entry index value 2, and entry index value 3, respectively. Entries 208-212 relate the palette indices to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector. The vector may be referred to as a palette prediction vector.

In some examples, as noted above, video encoder 20 and video decoder 30 may determine a palette predictor (which may also be referred to as a palette predictor table or palette predictor list) when performing palette prediction. The palette predictor may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor are to be copied to a palette for coding a current block.

Thus, in some examples, previously decoded palette entries are stored in a list for use as a palette predictor. This list may be used to predict palette entries in the current palette mode CU. A binary prediction vector may be signaled in the bitstream to indicate which entries in the list are re-used in the current palette. In U.S. Provisional Application No. 62/018,461, filed Jun. 27, 2014, run length coding is used to compress the binary palate predictor. In an example, the run-length value is coded using $0^{th}$ order Exp-Golomb code.

According to aspects of this disclosure, in some examples, video encoder 20 and video decoder 30 (e.g., entropy encoding unit 118 and entropy decoding unit 150) may be configured to code (e.g., encode and decode, respectively) a binary palette prediction vector for a palette of a block using a kth order truncated Exp-Golomb (TEGk) code, as described above with respect to the example of FIG. 1.

In some instances, video encoder 20 and video decoder 30 may be configured to code the binary palette prediction vector using the TEGk code in conjunction with the techniques described in standard submission document Seregin et al., "Non-SCCE3: Run-Length Coding for Palette Predictor," JCTVC-R0228, Sapporo, JP, 30 Jun.-9 Jul. 2014 (hereinafter JCTVC-R0228). In JCTVC-R0228, run-length coding is used to code the zero elements in a binary vector with the following conditions and steps:
  Run-length value equal to 1 indicates end of prediction
  The end of prediction is not signaled for the last 1 in the binary vector
  The number of preceding zero elements is coded for every 1 in the binary vector
  If the number of zero elements is greater than 0, the number plus one is signaled, due to the escape value of 1
  Run-length value is coded using 0-order Exponential Golomb code In an example for purposes of illustration, a binary palette prediction vector may be equal to {1100100010000}, indicating that four entries (indicated by the four ones) of the palette predictor are copied to the palette for coding a current block. In this example, video encoder 20 and video decoder 30 may code the vector as 0-0-3-4-1.

According to aspects of this disclosure, video encoder 20 and video decoder 30 may code the binary palette prediction vector using a maximal run value X for the vector, which may be equal to the number of palette entries in the palette predictor list minus current position in scanning order minus one). According to one example, video encoder 20 and video decoder 30 use a TEG0 code for coding the run value.

The techniques of this disclosure also relate to signaling a maximum palette predictor size. For example, according to aspects of this disclosure, video encoder 20 and video decoder 30 may be configured to code data indicating a maximum palette predictor size, e.g., in terms of the number of bits that can be included in vector 216. In some examples, video encoder 20 and video decoder 30 may code data indicating the maximum palette predictor size relative to one or more other values. For example, according to aspects of this disclosure, video encoder 20 and video decoder 30 may be configured to code data indicating the maximum palette predictor size as a delta (e.g., difference) between the maximum palette predictor size and the maximum palette size. In some instances, video encoder and video decoder 30 may code the delta using at least one of a fixed length code, a Golomb-Rice code, or an exponential Golomb code.

In some examples, syntax elements that indicate the maximum palette predictor size may be included in an SPS. In other examples, syntax elements that indicate the maximum palette predictor size may be included in another parameter set, such as an VPS or PPS, or in header data such as slice header data or data associated with an LCU or CU.

In some examples, video encoder 20 and video decoder 30 may vary, using the syntax elements that indicate the maximum palette predictor size, the maximum palette predictor size may be based on the particular profile, level, or bit-depth of the video data being coded. In other examples, video encoder 20 and video decoder 30 may vary, using the syntax elements that indicate the maximum palette predictor size, the maximum palette predictor size may be based on a size of the block being coded.

In an example for purposes of illustration, video encoder 20 and video decoder 30 may use the data regarding the maximum palette predictor size when constructing second palettes 192 for coding CU 188. For example, video encoder 20 and video decoder 30 may continue to add entries to a predictor palette (e.g., and bits to vector 216) until reaching a maximum palette predictor size, as indicated by the data. Video encoder 20 and video decoder 30 may then use vector 216 to construct the second palettes 192 for CU 188.

Figure 5:
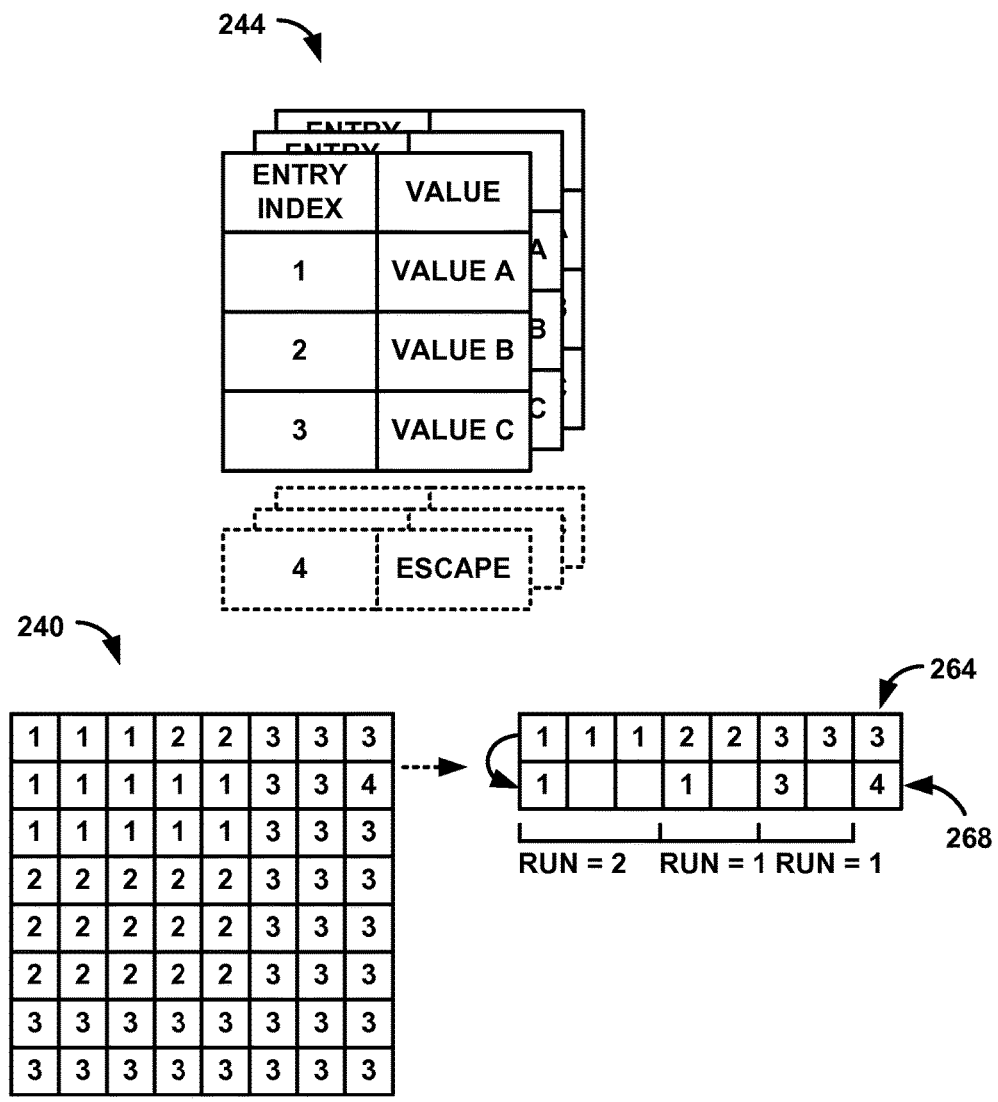
FIG. 5 is a conceptual diagram illustrating an example of determining palette indices to a palette for a block of pixels, consistent with techniques of this disclosure.

FIG. 5 is a conceptual diagram illustrating an example of determining palette indices to a palette for a block of pixels, consistent with techniques of this disclosure. For example, FIG. 5 includes a map 240 of palette indices that relate respective positions of pixels associated with the palette indices to an entry of palettes 244. For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples. In this case, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with palette indices. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette index (shown in the example of FIG. 5 as values 1-3) to indicate that pixel value in the palette and to allow video decoder to reconstruct the pixel value.

In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or palette indices in a given scan order that are coded together. As noted above, the string of palette indices (or pixel values indicated by the palette indices) may be referred to herein as a run. Video decoder 30 may obtain the syntax elements indicating a run from an encoded bitstream and use the data to determine the number of consecutive locations that have the same pixel or index value.

As noted above, runs may be used in conjunction with a CopyFromTop or Value mode. In an example for purposes of illustration, consider rows 264 and 268 of map 240. Assuming a horizontal, left to right scan direction, row 264 includes three palette indices of "1," two palette indices of "2," and three palette indices of "3." Row 268 includes five palette indices of "1," two palette indices of "3," and one sample that is not included in palettes 244 (represented by index 4, although a sample-level escape flag may be used for explicit escape signaling), which may be referred to as an escape sample.

In this example, video encoder 20 may use CopyFromTop mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode the fourth and fifth positions in row 268 (from left to right), using Value mode. For example, video encoder 20 may encode one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 using CopyFromTop mode relative to upper row 264. For example, video encoder 20 may signal a CopyFromTop mode and a run of 1. Accordingly, video encoder 20 may select between coding pixel values or palette indices of a line relative to other values of the line, e.g., using a run, coding pixel values or of a line relative to values of another line (or column), or a combination thereof. Video encoder 20 may, in some examples, perform a rate/distortion optimization to make the selection.

Video encoder 20 may then encode the escape sample for the final sample of row 268 (from left to right), which is not included in first palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

As noted above, there may be two techniques to code the escape sample. For example, with explicit escape signaling, video encoder 20 and video decoder 30 may code an explicit per-sample Escape mode flag for each sample position of map 240. If a particular sample (such as the final sample of row 268) is coded as an escape sample, video encoder 20 and video decoder 30 may code data that indicates the color value for the particular sample. If the sample is not coded as an escape sample, video encoder 20 and video decoder 30 may code additional data to indicate whether the mode is CopyFromTop or Value, such as an SPoint flag.

With implicit escape signaling, video encoder 20 and video decoder 30 may add an additional index to palettes 244 (entry index 4). Video encoder 20 and video decoder 30 may use the additional index to palettes 244 to indicate that a sample is coded as an escape sample, e.g., index 4. The additional index, however, does not have an associated color value. Rather, video encoder 20 and video decoder 30 also code color values for each sample that is associated with the additional index. If the sample is not coded as an escape sample, video encoder 20 and video decoder 30 may code data to indicate whether the mode is CopyFromTop or Value, such as an SPoint flag.

According to aspects of this disclosure, video encoder 20 and video decoder 30 may be configured to code one or more block-level syntax elements that indicate, for all samples of a block of video data, whether at least one sample of the block is coded based on a color value not being included in a palette of colors for the block. With respect to the example of FIG. 5, video encoder 20 and video decoder 30 may code one or more syntax elements associated with map 240 that indicate that at least one sample of map 240 is coded as an escape sample, i.e., the final sample of row 268.

In an example, the one or more syntax elements may be a block-level escape flag (referred to below as simply "escape flag"). For example, video encoder 20 may encode an escape flag having a value of one to indicate that map 240 includes a sample coded as an escape sample. Likewise, video decoder 30 may decode an escape flag having a value of one, which indicates that map 240 includes a sample coded as an escape sample. Accordingly, video encoder 20 may encode and video decoder 30 may decode map 240 in accordance with the escape flag. For example, video encoder 20 and video decoder 30 may add index 4 to first palettes 244, which may be used to represent samples coded as escape samples. Video encoder 20 and video decoder 30 may use this additional index during coding of map 240.

According to aspects of this disclosure, video encoder 20 may video decoder 30 may be configured to skip the coding of certain syntax based on the escape flag and the size of the palette being used to code a particular block. That is, while the example of FIG. 5 illustrates first palettes 244 having three entries, in some instances, a palette for coding a block of video data may include a single entry. In such instances, video encoder 20 and video decoder 30 may be configured to skip the coding of certain escape-related syntax based on the palette having a single entry and the escape flag indicating that no samples of the block are coded as escape samples.

For example, as in instances in which the escape flag indicates that no samples of the block are escape samples and when the size of a palette is one, video encoder 20 and video decoder 30 may be configured to infer that all samples of the block have the same index value (e.g., the only entry of the palette). Video encoder 20 and video decoder 30 may also, therefore, skip the coding of other all other data used to determine palette indices of the block.

In the example above, video encoder 20 and video decoder 30 may explicitly code block-level escape syntax (e.g., video encoder 20 may encode an escape flag in the bitstream, and video decoder 30 may decode such a flag from the bitstream). However, in some examples, video encoder 20 and video decoder 30 may infer (e.g., determine, without encoding or decoding the above-noted syntax element) the value of the block-level escape syntax element based on the size of palettes 244 used to code map 240. For example, video encoder 20 and video decoder 30 may make a preliminary determination regarding palette size in order to determine the value of the block-level escape flag. The block-level escape syntax element may only be coded in the bitstream when the palette size is greater than zero.

According to aspects of this disclosure, video encoder 20 and video decoder 30 may initially determine a size of a palette for coding a block of video data. Based on the size of the palette being zero, video encoder 20 and video decoder 30 may determine that the escape flag is equal to one and that all samples of the block are coded as escape samples, because there are no other palette entries available for coding samples.

For example, as in instances in which the palette size is zero, video encoder 20 and video decoder 30 may be configured to automatically determine that all samples of the block have the same index value (e.g., the additional entry of the palette associated with indicating escape samples). Video encoder 20 and video decoder 30 may also, therefore, skip the coding of the escape flag as well as all other data used to determine palette indices of the block.

Figure 6:
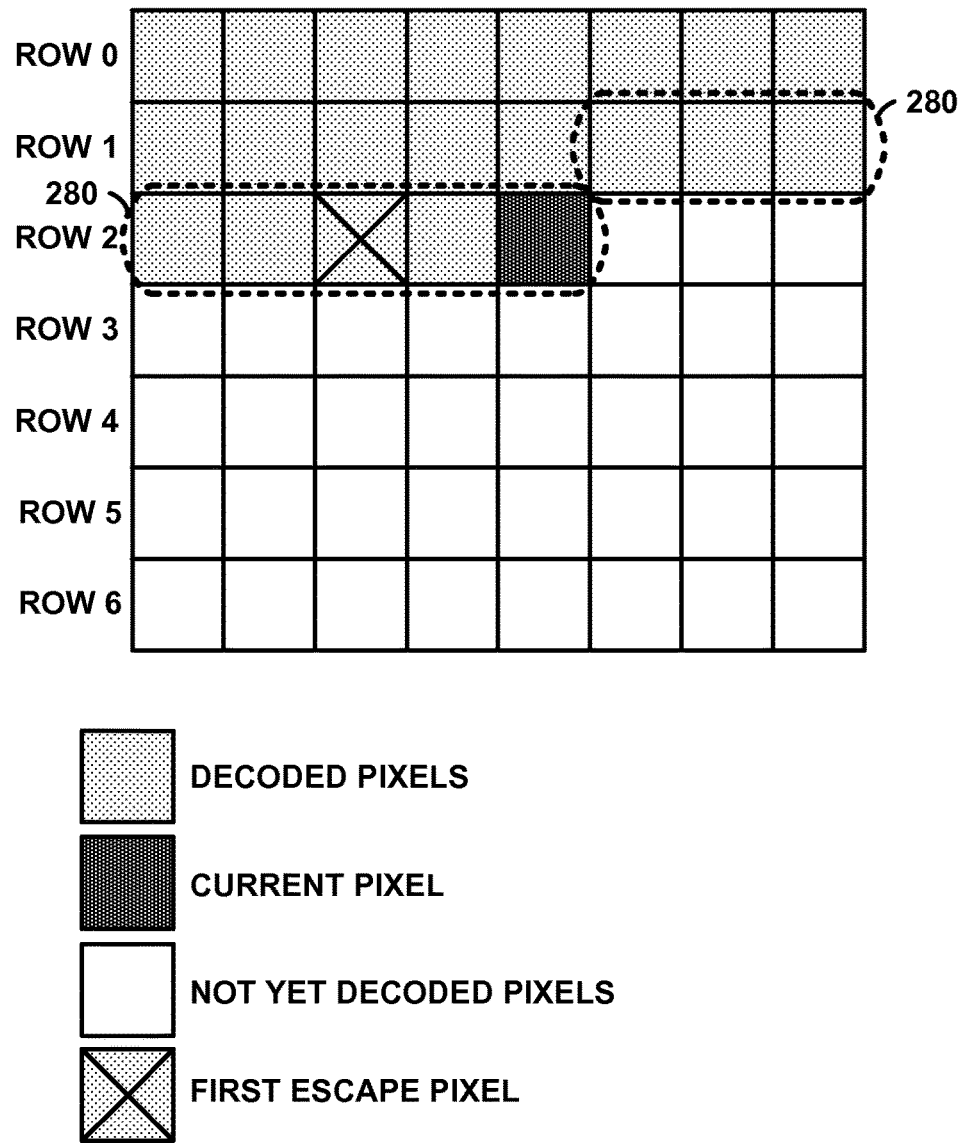
FIG. 6 is a conceptual diagram illustrating an example of determining a maximum run length for a block of pixels, consistent with techniques of this disclosure.

FIG. 6 is a conceptual diagram illustrating an example of determining maximum run length for CopyFromAbove mode, assuming raster scanning order, consistent with techniques of this disclosure. As noted above, the techniques of this disclosure include coding syntax for palette coding using a code that accounts for a maximum potential value of the syntax being coded.

In an example for purposes of illustration, video encoder 20 and video decoder 30 may code a run-length of a run of palette indices (e.g., a run of indices having the same value or a run of indices that are copied from above-neighboring indices). For example, video encoder 20 and video decoder 30 may determine, for a current palette-coded sample, a run length of a run of palette indices being coded together with the current sample. Video encoder 20 and video decoder 30 may also determine a maximum run length for a maximum run of palette indices able to be coded with the palette index of the pixel. Video encoder 20 and video decoder 30 may then code data that indicates the run length based on the determined maximum run length In some instances, according to aspects of this disclosure, the syntax may be coded using a form of Exponential Golomb code, such as the TEGk code described herein. To use the TEGk code, video encoder 20 and video decoder 30 may determine a maximum run-length as the number of pixels in the current CU minus the current position in scanning order minus 1.

In some palette coding techniques, runs of pixels associated with CopyFromAbove mode (where a video coder copies an index of a pixel above the current pixel) is not permitted to include any escape pixels. That is, a video coder must stop a CopyFromAbove run if the current pixel's above-neighboring pixel is a pixel coded as an escape sample. Hence, the maximum CopyFromAbove run length is bounded by the distance between the current pixel position and the position having an above-neighboring pixel that is escaped in the scanning order.

In an example for purposes of illustration, the starting position of a CopyFromAbove run in scanning order is A, the above-neighboring pixel to the pixel in position A+L (L>0) (or in some examples, A+L (L>1)) is coded as an escape sample, and the above-neighboring pixel to the pixel at position A+l (l<L) is not coded as an escape sample. If such a pixel L does not exist, video encoder 20 may assign L to the position after the last pixel in the block in scanning order. In accordance with the techniques of this disclosure, video encoder 20 and video decoder 30 may use TEGk to code the run length for the CopyFromAbove mode with the restriction that the maximum coded run-length is no longer than L−1. Alternatively, if unary prefixes of greater than 0, greater than 1, and greater than 2 are used when coding a run-length, video encoder 20 or video decoder 30 may set the maximum run-length of the run of the index map to be coded using TEGk to L−4.

In instances in which video decoder 30 or video encoder 20 cannot determine whether a pixel in a position corresponds to an escape pixel or not, video encoder 20 and video decoder 30 may process the pixel as if it is not coded as an escape sample, i.e. the maximum coded run length does not stop. In the example of FIG. 6, if none of the pixels encompassed by dashed lines 280 is coded as an escape sample, the maximum possible run length is 35 (i.e. the number of unshaded pixel positions). If one or more of the pixels within dashed lines 280 is coded as an escape sample, assuming that the pixel marked as the escape pixel (the pixel position with the "X") is the first escape pixel within dashed lines 280 in scanning order, then the maximum possible coded copy above run length is five.

In some examples, video decoder 30 may only determine the run mode (e.g., the palette mode in which the pixels are coded) for the pixels within dashed lines 280. Hence, in the worst case, video decoder 30 makes the determination for BlockWidth-1 pixels. In some examples, video decoder 30 may be configured to implement certain restrictions regarding the maximum of number of pixels for which the run mode is checked. For example, video decoder 30 may only check the pixels within dashed lines 280 if the pixels are in the same row as the current pixel. Video decoder 30 may infer that all other pixels within dashed lines 280 are not coded as escape samples. The example in FIG. 6 assumes a raster scanning order. The techniques however, may be applied to other scanning orders, such as vertical, horizontal traverse, and vertical traverse.

Figure 7:
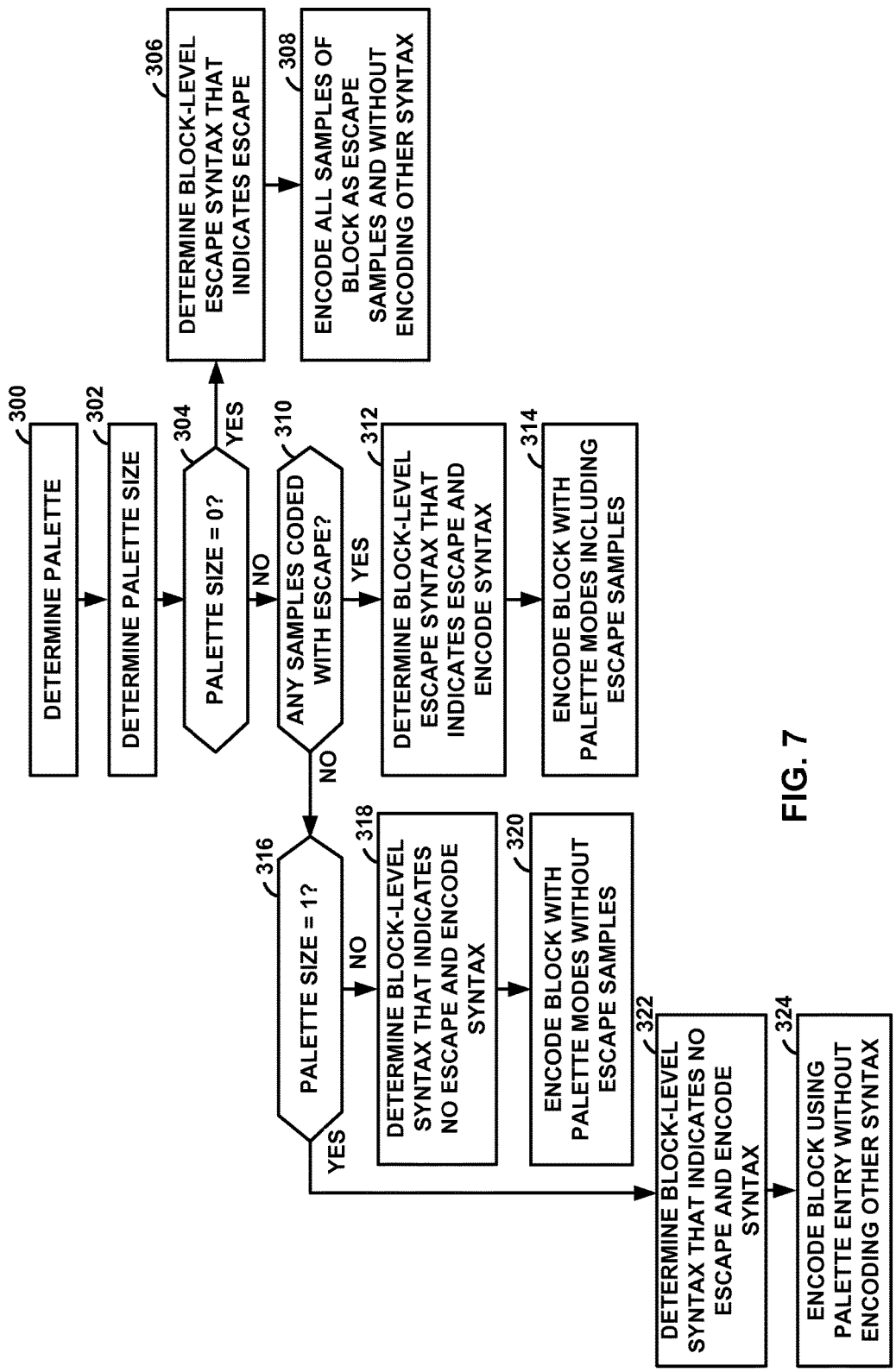
FIG. 7 is a flowchart illustrating an example process for encoding a block of video data based on one or more block-level syntax elements that indicate whether any sample of the block is encoded as escape samples, consistent with techniques of this disclosure.

FIG. 7 is a flowchart illustrating an example process for encoding a block of video data based on one or more block-level syntax elements that indicate whether any samples of a block are encoded as escape samples, consistent with techniques of this disclosure. The process of FIG. 7 is generally described as being performed by video encoder 20 for purposes of illustration, although a variety of other processors may also carry out the process shown in FIG. 7.

In the example of FIG. 7, video encoder 20 determines a palette for encoding a block of video data (300). In some examples, video encoder 20 may determine the palette-based palettes of one or more previously encoded blocks, e.g., using a palette predictor. Video encoder 20 may also determine the size of the palette (302). For example, video encoder 20 may determine a number of entries in the determined palette.

Video encoder 20 may determine whether the palette size is zero (304). Based on the palette size being equal to zero (the yes branch of step 304), video encoder 20 may determine that block-level escape syntax that indicates that at least one sample of the block is an escape sample (306). In one example, video encoder 20 may determine that a block-level escape flag is equal to one. Video encoder 20 then encodes all samples of the block as escape samples and without encoding other syntax elements for the block (308). For example, video encoder 20 may not encode an indication of the block-level escape flag, because the block-level escape syntax element may only be encoded in the bitstream when the palette size is greater than zero. In addition, video encoder 20 may not encode other data for palette indices of the block, such as syntax that indicates a palette mode (e.g., Value or CopyFromTop), syntax associated with determining runs, syntax associated with palette indices, and any other related syntax.

If the palette size is not zero (the no branch of step 304), video encoder 20 may determine whether any samples of the block are encoded as escape samples (310). Based on determining that at least one sample of the block is encoded as an escape sample (the yes branch of step 310) video encoder 20 may determine block-level escape syntax that indicates that at least one sample of the block is encoded as an escape sample and encode an indication of the block-level syntax in a bitstream with the block (312). For example, video encoder 20 may set a block-level escape flag equal to one and encode an indication of the escape flag in the bitstream. Video encoder 20 also encodes the block with palette coding modes, including encoding at least one pixel of the block as an escape sample (314).

Based on no samples being encoded as escape samples (the no branch of step 310), video encoder 20 may determine whether a palette size of the palette for the block is equal to one (316). Based on determining that the palette size is not equal to one (the no branch of step 316), video encoder 20 may determine block-level escape syntax that indicates that no samples of the block are encoded as escape samples encode an indication of the block-level escape syntax in the bitstream (318). For example, video encoder 20 may set a block-level escape flag equal to zero and encode an indication of the escape flag in the bitstream. Video encoder 20 also encodes the block using palette coding modes but without encoding any escape samples (320). For example, video encoder 20 may encode palette indices of the block using CopyFromTop or Value modes and encode syntax associated with the use of such modes, e.g., syntax that indicates modes, palette indices, runs, and the like.

Based on determining that the palette size is equal to one (the yes branch of step 316), video encoder 20 may determine block-level escape syntax that indicates that no samples of the block are coded as escape samples and encode an indication of the block-level escape syntax in the bitstream (322). For example, video encoder 20 may set a block-level escape flag equal to zero and encode an indication of the escape flag in the bitstream. Video encoder 20 also encodes an indication that all samples of the block have the same index value and without encoding other syntax (324). For example, video encoder 20 may skip the encoding of syntax associated with the use of palette modes, e.g., syntax that indicates modes, palette indices, runs, and the like.

Figure 8:
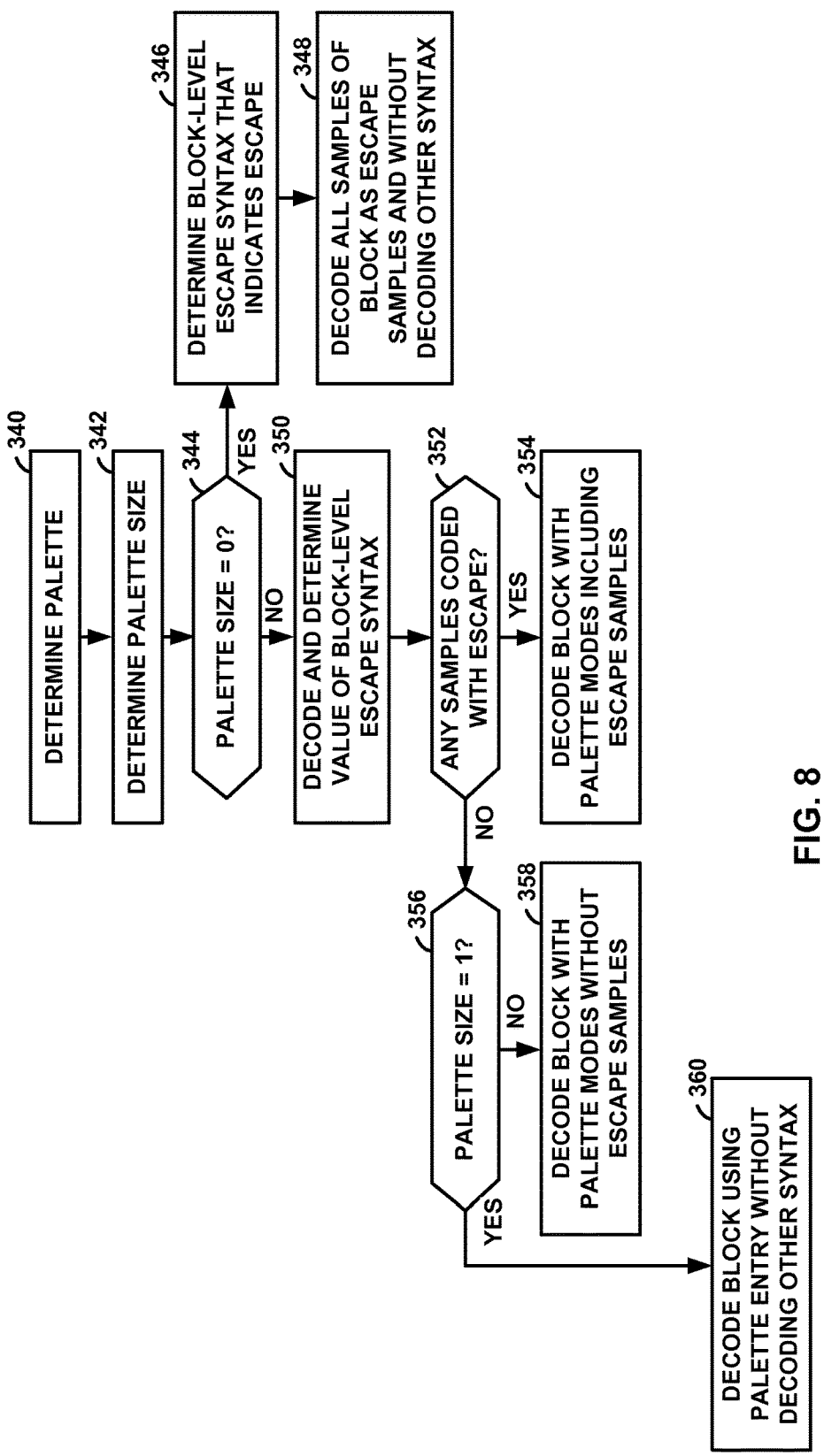
FIG. 8 is a flowchart illustrating an example process for decoding a block of video data based on one or more block-level syntax elements that indicate whether any sample of the block is decoded as an escape sample, consistent with techniques of this disclosure.

FIG. 8 is a flowchart illustrating an example process for decoding a block of video data based on one or more block-level syntax elements that indicate whether any samples of a block are decoded as escape samples, consistent with techniques of this disclosure. The process of FIG. 8 is generally described as being performed by video decoder 30 for purposes of illustration, although a variety of other processors may also carry out the process shown in FIG. 8.

In the example of FIG. 8, video decoder 30 determines a palette for decoding a block of video data (340). In some examples, video decoder 30 may determine the palette-based palettes of one or more previously encoded blocks. e.g., using a palette predictor signaled in a bitstream being decoded. Video decoder 30 may also determine the size of the palette (342). For example, video decoder 30 may determine a number of entries in the determined palette.

Video decoder 30 may determine whether the palette size is zero (344). Based on the palette size being equal to zero (the yes branch of step 344), video decoder 30 may determine block-level escape syntax that indicates that at least one sample of the block is encoded as an escape sample (346). In one example, video decoder 30 may determine that a block-level escape flag is equal to one. For example, video decoder 30 may infer that the block-level escape flag is equal to one without decoding the flag from the bitstream, because the block-level escape syntax element may only be coded in the bitstream when the palette size is greater than zero. Video decoder 30 then decodes all samples of the block using the color associated with the escape sample and without decoding other syntax elements for the block (e.g., other than the color value(s) associated with the escape sample) (348). For example, as noted above, video decoder 30 may not decode an indication of the block-level escape flag. In addition, video decoder 30 may not decode other data for palette indices of the block, such as syntax that indicates a palette mode (e.g., Value or CopyFromTop), syntax indicating index values, syntax associated with determining runs, and any other related syntax.

If the palette size is not zero (the no branch of step 344), video decoder 30 may decode block-level escape syntax from the bitstream and determine a value of the block-level syntax (350). For example, video decoder 30 may decode a block-level escape flag and determine whether the value is equal to zero or one.

Video decoder 30 may then determine whether any samples of the block are coded as an escape sample, e.g., based on the decoded syntax (352). Based on determining that at least one sample of the block is encoded as an escape sample (the yes branch of step 352), video decoder 30 may decode the block with palette coding modes, including decoding at least one sample of the block as an escape sample (354). Video decoder 30 may also decode at least one color value corresponding to the escape samples.

Based on no samples are encoded as escape samples (the no branch of step 352), video decoder 30 may determine whether a palette size of the palette for the block is equal to one (356). Based on determining that the palette size is not equal to one (the no branch of step 356), video decoder 30 may decode the block using palette coding modes but without decoding any escape samples (358). For example, video decoder 30 may decode palette indices of the block using CopyFromTop or Value modes and decode syntax associated with the use of such modes, e.g., syntax that indicates modes, palette indices, runs, and the like.

Based on determining that the palette size is equal to one (the yes branch of step 356), video decoder 30 may decode the block using the palette entry of the palette (e.g., the only entry present in the palette) and without decoding other syntax (360). For example, video decoder 30 may skip the decoding of syntax associated with the use of palette modes, e.g., syntax that indicates modes, palette indices, runs, and the like.

Figure 9:
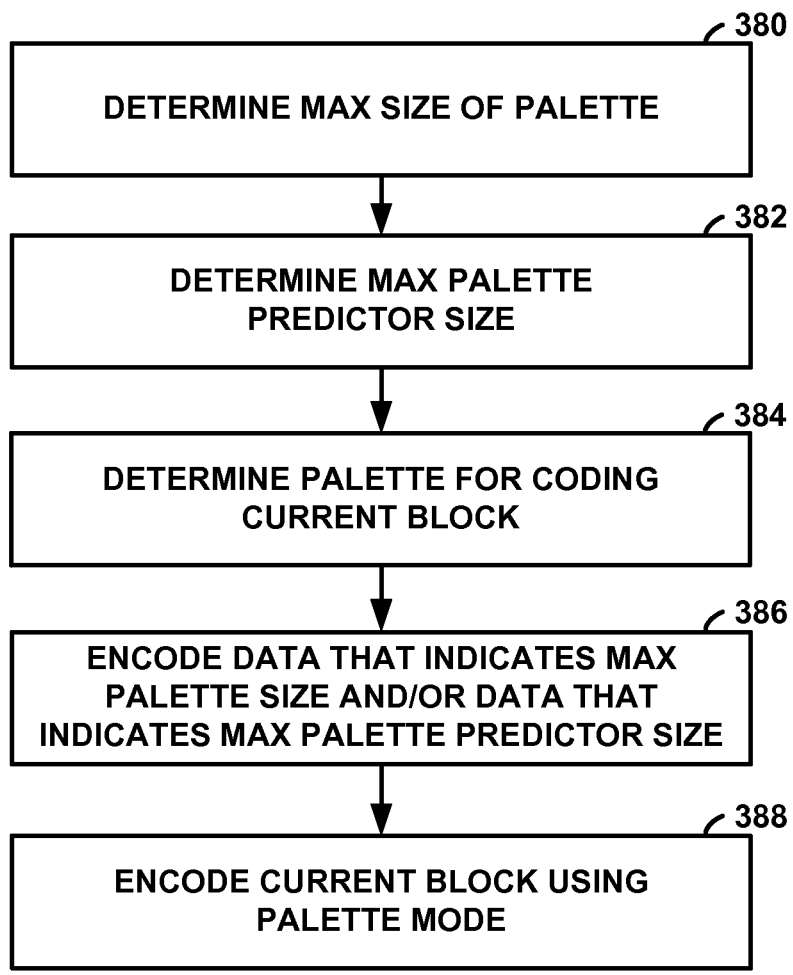
FIG. 9 is a flowchart illustrating an example process for encoding a block of video data based on one or more syntax elements that indicate a maximum palette size and a maximum palette predictor size, consistent with techniques of this disclosure.

FIG. 9 is a flowchart illustrating an example process for encoding a block of video data based on one or more syntax elements that indicate a maximum palette size and a maximum palette predictor size, consistent with techniques of this disclosure. The process of FIG. 9 is generally described as being performed by video encoder 20 for purposes of illustration, although a variety of other processors may also carry out the process shown in FIG. 9.

In the example of FIG. 9, video encoder 20 to may determine a maximum size of a palette for encoding a current block of video data in palette mode (380). For example, video encoder 20 may be configured to determine a maximum palette size based on a characteristic of the video data being encoded. In some examples, video encoder 20 may determine a maximum palette size based on a bit-depth of the data (e.g., an input bit-depth or a profile bit-depth), a block size of the block, a profile or level associated with the video data, or the like.

Video encoder 20 to may also determine a maximum palette predictor size of a palette predictor for creating a palette of the current block (382). For example, video encoder 20 may be configured to determine a maximum palette predictor size based on a characteristic of the video data being encoded. In some examples, video encoder 20 may determine a maximum palette predictor size based on a bit-depth of the data (e.g., an input bit-depth or a profile bit-depth), a block size of the block, a profile or level associated with the video data, or the like.

Video encoder 20 also encodes data that indicates the maximum palette size and/or the maximum palette predictor size in a bitstream that includes the current block (386). In some examples, video encoder 20 may encode data indicating the maximum palette size and/or maximum palette predictor size relative to one or more other values. For example, according to aspects of this disclosure, video encoder 20 may be configured to code data indicating the maximum palette predictor size as a delta (e.g., difference) between the maximum palette predictor size and the maximum palette size.

According to aspects of this disclosure, video encoder 20 may encode one or more syntax elements that indicate the maximum palette size and/or the maximum palette predictor size in a SPS. In other examples, video encoder 20 may encode such syntax in another parameter set (e.g., a PPS), in a slice header of a slice that includes the current block, or elsewhere in the bitstream.

Video encoder 20 also encodes the current block in accordance with the data that indicates the maximum palette size and/or the maximum palette predictor size (388). For example, video encoder 20 may determine a palette that is limited by the maximum palette size and/or a palette predictor that is limited by the maximum palette predictor size.

Figure 10:
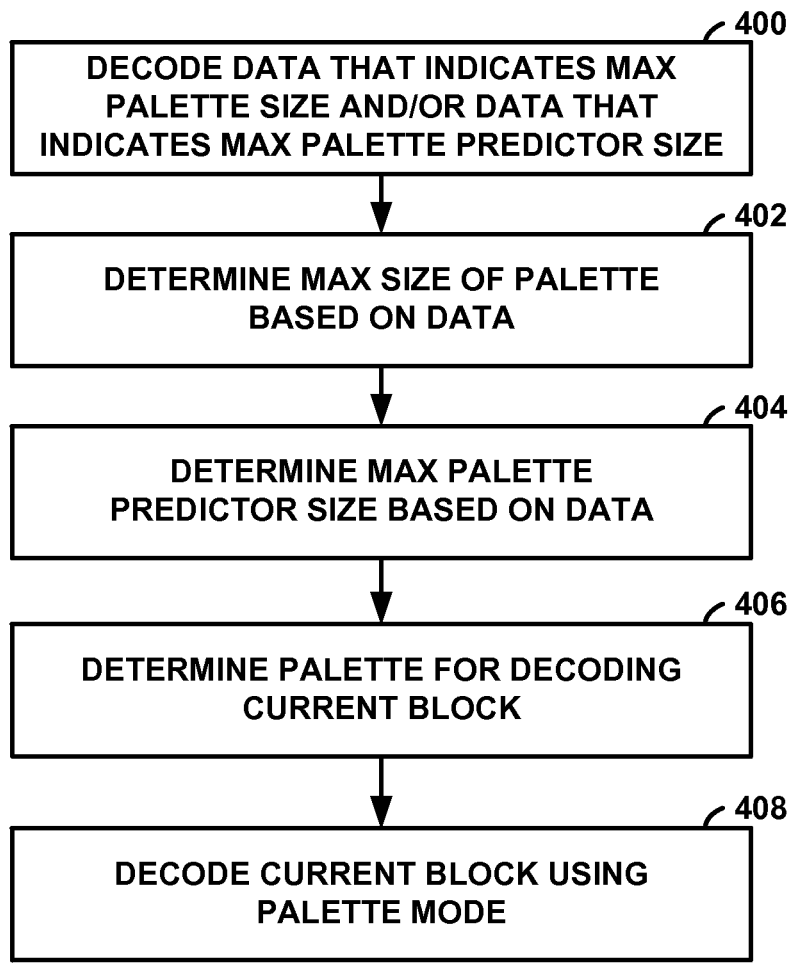
FIG. 10 is a flowchart illustrating an example process for encoding a block of video data based on one or more syntax elements that indicate a maximum palette size and a maximum palette predictor size, consistent with techniques of this disclosure.

FIG. 10 is a flowchart illustrating an example process for encoding a block of video data based on one or more syntax elements that indicate a maximum palette size and a maximum palette predictor size, consistent with techniques of this disclosure. The process of FIG. 10 is generally described as being performed by video decoder 30 for purposes of illustration, although a variety of other processors may also carry out the process shown in FIG. 10.

In the example of FIG. 10, video decoder 30 decodes data that indicates a maximum palette size and/or a maximum palette predictor size from a bitstream that includes a current block being decoded in palette mode (400). In some examples, video encoder 20 may encode data indicating the maximum palette size and/or maximum palette predictor size relative to one or more other values. For example, according to aspects of this disclosure, video encoder 20 may be configured to code data indicating the maximum palette predictor size as a delta (e.g., difference) between the maximum palette predictor size and the maximum palette size.

According to aspects of this disclosure, video decoder 30 may decode one or more syntax elements that indicate the maximum palette size and/or the maximum palette predictor size from an SPS. In other examples, video decoder 30 may decode such syntax from another parameter set (e.g., a PPS), from a slice header of a slice that includes the current block, or elsewhere in the bitstream.

Video decoder 30 to may determine the maximum size of a palette for decoding the current block based on the decoded data (402). Video decoder 30 to may also determine a maximum palette predictor size of a palette predictor for creating a palette for the current block based on the data (404). Video decoder 30 also decodes the current block in accordance with the data that indicates the maximum palette size and/or the maximum palette predictor size (408). For example, video decoder 30 may determine a palette that is limited by the maximum palette size and/or a palette predictor that is limited by the maximum palette predictor size.

Figure 11:
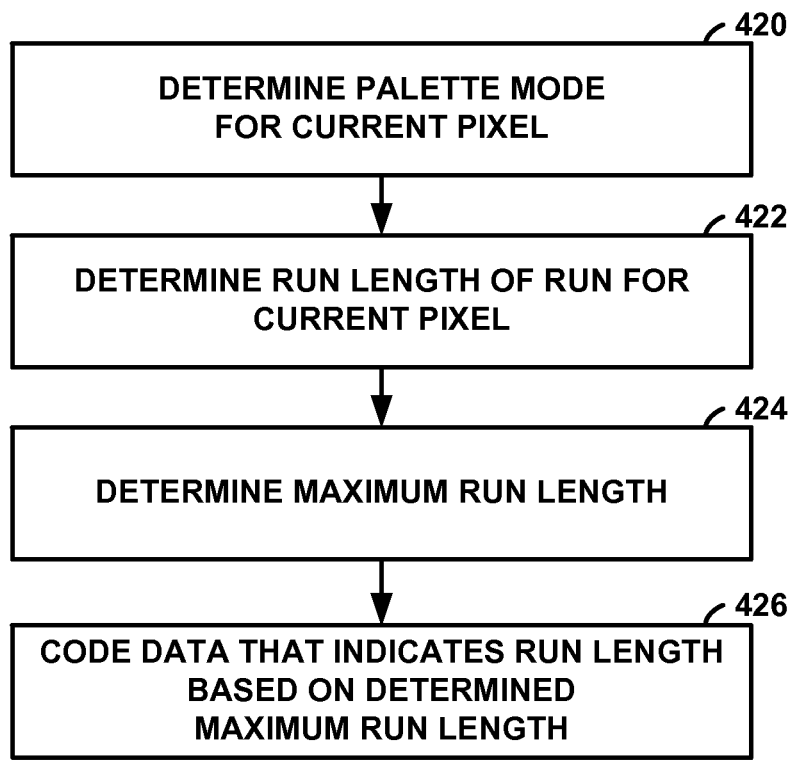
FIG. 11 is a flowchart illustrating an example process for coding (encoding or decoding) data that indicates a run length of a run of pixels based a maximum potential run length, consistent with techniques of this disclosure.

FIG. 11 is a flowchart illustrating an example process for coding (encoding or decoding) data that indicates a run length of a run of pixels based a maximum potential run length, consistent with techniques of this disclosure. The process of FIG. 11 is generally described as being performed by a video coder, such as video encoder 20 or video decoder 30, for purposes of illustration, although a variety of other processors may also carry out the process shown in FIG. 1I.

In the example of FIG. 11, the video coder may determine a palette mode for coding a current pixel (420). For example, the video coder may determine whether the current pixel is coded using a CopyFromTop mode, a Value mode, or another palette-based coding mode. The video coder also determines a run length of a run for the current pixel (422). For example, the video coder determines the number of palette indices being coded with the palette index of the current pixel.

The video coder also determines a maximum run length for the run (424). For example, the video coder may determine a maximum run length for a maximum run of palette indices able to be coded with the palette index of the current pixel. In an example, the video coder may determine a number of pixels in the block of video data that includes the pixel. The video coder may also determine a position of the current pixel in the block based on a scanning order used to scan the palette indices. The video coder then determines the maximum run length as the number of pixels in the block minus the pixel position of the current pixel minus one.

The video coder also codes data that indicates the run length of the run based on the determined maximum run length (426). For example, according to aspects of this disclosure, the video coder may code data that indicates the run length using a TEGk code.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining a value of a block-level syntax element, wherein the block-level syntax element corresponds to an entirety of a block of the video data that includes a plurality of samples, and wherein the value of the block-level syntax element indicates whether at least one respective sample of the plurality of samples included in the block is coded using a color value of the at least one respective sample not being included in a palette of color values for coding the block of video data; and
   coding the block of video data based on the value of the block-level syntax element.

2. The method of claim 1, wherein determining the value of the block-level syntax element comprises determining a value of a block-level escape flag that indicates whether at least one respective sample of the block is coded as an escape sample.

3. The method of claim 2, wherein the block of the video data comprises a coding unit (CU) of the video data, and wherein determining the value of the block-level escape flag comprises determining the value of the block-level escape flag for the CU.

4. The method of claim 3, further comprising:
   coding palette entries associated with the color values of the palette for the CU; and
   coding the block-level escape flag for the CU after coding the palette entries associated with the color values of the palette.

5. The method of claim 3, further comprising:
   coding the block-level escape flag for the CU; and
   coding palette entries associated with the color values of the palette for the CU after coding the block-level escape flag for the CU.

6. The method of claim 3, further comprising conditionally coding the block-level escape flag for the CU based on a size of the CU, wherein conditionally coding the block-level escape flag for the CU comprises only coding the block-level escape flag when the size of the CU exceeds a threshold size.

7. The method of claim 1, further comprising:
   determining, based on the value of the block-level syntax element, that all samples of the plurality of samples included in the block are coded according to the color values of the palette;
   determining that a palette size that indicates a number of palette indices included in the palette of color values for the block is equal to one; and
   based on the determined palette size being equal to one, coding all samples of the block based on the one index of the palette and without coding any other syntax for the block that indicates palette indices for the block.

8. The method of claim 7, wherein coding the block without coding any other syntax for the block that indicates palette indices for the block comprises coding the block without coding at least one of data that indicates a palette mode associated with coding the block, data that indicates index values of the palette of color values for the block, or data that indicates a run of palette indices of the palette.

9. The method of claim 1, further comprising:
   determining that a palette size that indicates a number of palette indices of the palette for the block is equal to zero; and
   based on the determined palette size being equal to zero, determining the value of the block-level syntax element at least in part by inferring the value of the block-level syntax element, wherein inferring the value of the block-level syntax element comprises determining the value of the block-level syntax element without coding the block-level syntax element, and wherein the inferred value of the block-level syntax element indicates that all samples of the block are coded based on color value information not included in the palette.

10. The method of claim 9, wherein coding the block of the video data comprises coding, based on the determined palette size being zero indices, all samples of the plurality of samples included in the block using the color value information that is not included in the palette and without coding any other syntax for the block that indicates palette indices for the palette of color values for the block of the video data.

11. The method of claim 10, wherein coding the block without coding any other syntax for the block that indicates palette indices for the block comprises coding the block without coding at least one of data that indicates a palette mode associated with coding the block, data that indicates palette indices of the palette of color values for the block, or data that indicates a run of palette indices of the palette.

12. The method of claim 1, wherein coding the block of the video data comprises encoding the block of the video data, and wherein encoding the block of the video data based on the value of the block-level syntax element comprises:
based on the determined value of the block-level syntax element indicating that the at least one respective sample of the plurality of samples included in the block is to be encoded using the color value of the at least one respective sample not being included in the palette of colors, entropy encoding respective index values for all samples of the plurality of samples included in the block, wherein the respective index values identify respective entries of the palette, and wherein one of the respective index values indicates an escape sample that is to be encoded using the color value that is not included in the palette of colors; and
signaling the respective index values of the palette in an encoded bitstream.

13. The method of claim 1, wherein coding the block of the video data comprises decoding the block of the video data, and wherein decoding the block of the video data based on the value of the block-level syntax element comprises:
obtaining, from an encoded bitstream, respective index values of a palette of color values for the block for the plurality of samples included in the block of the video data, wherein each of the respective index values identifies a respective entry of the palette of color values;
and
based on the determined value of the block-level syntax element indicating that the at least one respective sample of the plurality of samples included in the block is to be decoded using the color value of the at least one respective sample not being included in the palette of colors:
entropy decoding values for all samples of the plurality of samples included in the block by matching the respective index values to at least one of the entries of the palettes; and
entropy decoding the at least one sample using the respective color value that is not included in the palette of color values.

14. A device for processing video data, the device comprising:
a memory configured to store a block of video data, the block including a plurality of samples; and
one or more processors in communication with the memory, the one or more processors being configured to:
determine a value of a block-level syntax element, wherein the block-level syntax element corresponds to an entirety of a block of the video data that includes a plurality of samples, and wherein the value of the block-level syntax element indicates whether at least one respective sample of the plurality of samples included in the block of video data stored to the memory is coded using a color value of the at least one respective sample not being included in a palette of color values for coding the block of video data; and
code the block of video data stored to the memory based on the value of the block-level syntax element.

15. The device of claim 14, wherein to determine the value of the block-level syntax element, the one or more processors are configured to determine a value of a block-level escape flag that indicates whether at least one respective sample of the plurality of samples included in the video data stored to the memory is coded as an escape sample.

16. The device of claim 15, wherein the block of the video data stored to the memory comprises a coding unit (CU) of the video data stored to the memory, and wherein to determine the value of the block-level escape flag, the one or more processors are configured to determine the value of the block-level escape flag for the CU.

17. The device of claim 16, wherein the one or more processors are further configured to:
code palette entries associated with the color values of the palette for the CU; and
code the block-level escape flag for the CU after coding the palette entries associated with the color values of the palette.

18. The device of claim 16, wherein the one or more processors are further configured to:
code the block-level escape flag for the CU; and
code palette entries of the palette for the CU after coding the block-level escape flag for the CU.

19. The device of claim 16, wherein the one or more processors are further configured to conditionally code the block-level escape flag for the CU based on a size of the CU, wherein to conditionally code the block-level escape flag for the CU, the one or more processors are configured to only code the block-level escape flag when the size of the CU exceeds a threshold size.

20. The device of claim 14, wherein the one or more processors are further configured to:
determine, based on the value of the block-level syntax element, that all samples of the plurality of samples included in the block are coded according to the color values of the palette of color values;
determine that a palette size that indicates a number of palette indices included in the palette of color values for the block is equal to one; and
code, based on the determined palette size being equal to one, all samples of the plurality of samples included in the block based on the one index of the palette and without coding any other syntax for the block that indicates palette indices for the block of the video data stored to the memory.

21. The device of claim 20, wherein to code the block without coding any other syntax for the block that indicates palette indices for the block, the one or more processors are configured to code the block without coding at least one of data that indicates a palette mode associated with coding the block, data that indicates index values of the palette of color values for the block of the video data stored to the memory, or data that indicates a run of palette indices of the palette.

22. The device of claim 14, wherein the one or more processors are further configured to:
determine that a palette size that indicates a number of palette indices of the palette for the block is equal to zero; and
based on the determined palette size being zero indices, to determine the value of the block-level syntax element, the one or more processors are configured to infer the value of the block-level syntax element including determining the value of the block-level syntax element without coding the block-level syntax element, and wherein the inferred value of the block-level syntax element indicates that all samples of the block are coded based on color value information not included in the palette.

23. The device of claim 22, wherein to code the block of the video data stored to the memory, the one or more processors are configured to code, based on the determined palette size being zero indices, all samples of the plurality of samples included in the block using the color value information that is not included in the palette and without coding any other syntax for the block that indicates palette indices for the palette of color values for the block of the video data stored to the memory.

24. The device of claim 23, wherein to code the block without coding any other syntax for the block that indicates palette indices for the block, the one or more processors are configured to code the block without coding at least one of data that indicates a palette mode associated with coding the block, data that indicates palette indices of the palette of color values for the block, or data that indicates a run of palette indices of the palette.

25. The device of claim 14, wherein to code the block of the video data stored to the memory, the one or more processors are configured to encode the block of the video data stored to the memory, and wherein to encode the block of the video data based on the value of the block-level syntax element, the one or more processors are configured to:
based on the determined value of the block-level syntax element indicating that the at least one respective sample of the plurality of samples included in the block is to be encoded using the color value of the at least one respective sample not being included in the palette of colors, entropy encode respective index values for all samples of the plurality of samples included in the block, wherein the respective index values identify respective entries of the palette, and wherein one of the respective index values indicates an escape sample that is to be encoded using the color value that is not included in the palette of colors; and
signal the respective index values in an encoded bitstream.

26. The device of claim 14, wherein to code the block of the video data stored to the memory, the one or more processors are configured to decode the block of the video data stored to the memory, and wherein to decode the block of the video data based on the value of the block-level syntax element, the one or more processors are configured to:
obtain, from an encoded bitstream, respective index values of a palette of color values for the block for the plurality of samples included in the block, wherein each of the respective index values identifies a respective entry of the palette of color values; and
based on the determined value of the block-level syntax element indicating that the at least one respective sample of the plurality of samples included in the block is to be decoded using the color value of the at least one respective sample not being included in the palette of colors;
entropy decode values for all samples of the plurality of samples included in the block by matching the respective index values to at least one of the entries of the palette; and
entropy decode the at least one sample using the respective color value that is not included in the palette of color values.

27. The device of claim 26, further comprising a display configured to display the decoded block.

28. The device of claim 14, wherein the device comprises at least one of:
an integrated circuit;
a microprocessor;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

29. An apparatus for processing video data, the apparatus comprising:
means for determining a value of a block-level syntax element, wherein the block-level syntax element corresponds to an entirety of a block of the video data that includes a plurality of samples, and wherein the value of the block-level syntax element indicates whether at least one respective sample of the plurality of samples included in the block is coded using a color value of the at least one respective sample not being included in a palette of color values for coding the block of video data; and
means for coding the block of video data based on the value of the block-level syntax element.

30. A non-transitory computer-readable medium having stored thereon instructions that, when executed, cause one or more processors of a video coding device to:
determine a value of a block-level syntax element, wherein the block-level syntax element corresponds to an entirety of a block of the video data that includes a plurality of samples, and wherein the value of the block-level syntax element indicates whether at least one respective sample of the plurality of samples included in the block is coded using a color value of the at least one respective sample not being included in a palette of color values for coding the block of video data; and
code the block of video data based on the value of the block-level syntax element.

* * * * *